United States Patent
Canter et al.

(10) Patent No.: US 12,425,222 B2
(45) Date of Patent: *Sep. 23, 2025

(54) SYSTEMS, TAMPER-EVIDENT ASSEMBLIES AND METHODS TO DETECT TAMPERING AND/OR PROVIDE CRYPTOGRAPHIC EVIDENCE OF TAMPERING

(71) Applicant: Hart InterCivic, Inc., Austin, TX (US)

(72) Inventors: James M. Canter, Austin, TX (US); Viktor Partyshev, Round Rock, TX (US); David Orr, Austin, TX (US)

(73) Assignee: Hart InterCivic, Inc., Austin, TX (US)

( * ) Notice: Subject to any disclaimer, the term of this patent is extended or adjusted under 35 U.S.C. 154(b) by 454 days.

This patent is subject to a terminal disclaimer.

(21) Appl. No.: 17/506,832

(22) Filed: Oct. 21, 2021

(65) Prior Publication Data

US 2023/0127682 A1    Apr. 27, 2023

(51) Int. Cl.
*H04L 9/00* (2022.01)
*F16B 41/00* (2006.01)
(Continued)

(52) U.S. Cl.
CPC .......... *H04L 9/3236* (2013.01); *F16B 41/005* (2013.01); *G06F 21/73* (2013.01);
(Continued)

(58) Field of Classification Search
CPC ........ G06F 21/73; G06F 21/86; F16B 41/005; H05K 5/0208; H04L 9/3236
See application file for complete search history.

(56) References Cited

U.S. PATENT DOCUMENTS

| 2,892,572 A | 6/1959 | Fredette et al. |
| 4,125,051 A | 11/1978 | Herkes et al. |

(Continued)

FOREIGN PATENT DOCUMENTS

| JP | 4384046 B2 * | 6/2005 | ............. F16B 37/14 |
| KR | 20150011803 * | 2/2015 | ......... E05B 19/0005 |
| WO | WO-2020136628 A1 * | 7/2020 | |

OTHER PUBLICATIONS

Brycefasterner, Manufacturer Of The World's Most Secure Fasteners, Key-Rex Custom Manufactured Security Bolts, Screws & Nuts, 2020, 9 pgs.

(Continued)

*Primary Examiner* — Kevin Ayala
(74) *Attorney, Agent, or Firm* — Egan, Enders & Huston LLP.

(57) ABSTRACT

Embodiments of systems and methods are disclosed to detect tampering and/or provide cryptographic evidence of tampering. Tampering is detected and tamper evidence is provided by incorporating at least one tamper-evident assembly and at least one processing device within an enclosure housing a host device. The tamper-evident assembly includes one or more tamper-evident fasteners, each having an identification chip, which stores a unique identifier corresponding to the tamper-evident fastener and transmits the unique identifier through the tamper-evident fastener to the at least one processing device when the tamper-evident fastener is coupled to a surface of the enclosure to secure a point of entry on the enclosure. The processing device may detect tampering and/or provide cryptographic evidence of tampering when a hash of the unique identifier (s) detected when the host device is in use does not match a hash of the unique identifier(s) detected before the host device is used.

34 Claims, 12 Drawing Sheets

(51) Int. Cl.
*G06F 21/73* (2013.01)
*G06F 21/86* (2013.01)
*H04L 9/06* (2006.01)
*H04L 9/32* (2006.01)
*H05K 5/02* (2006.01)

(52) U.S. Cl.
CPC ............ *G06F 21/86* (2013.01); *H04L 9/0643* (2013.01); *H05K 5/0208* (2013.01)

(56) References Cited

U.S. PATENT DOCUMENTS

| | | | |
|---|---|---|---|
| 5,651,652 | A | 7/1997 | Williams et al. |
| 8,225,998 | B2 | 7/2012 | Bolton |
| 8,279,067 | B2 | 10/2012 | Berger |
| 8,963,712 | B2 | 2/2015 | Mullis et al. |
| 9,286,565 | B2 * | 3/2016 | Arai ................... B65D 41/3423 |
| 9,740,888 | B1 * | 8/2017 | Aga ......................... G06F 21/86 |
| 10,109,221 | B2 | 10/2018 | Yazdi et al. |
| 10,235,908 | B2 | 3/2019 | Yazdi et al. |
| 10,766,677 | B2 | 9/2020 | Keep |
| 11,049,349 | B2 | 6/2021 | Onischuk |
| 11,681,833 | B2 * | 6/2023 | Razaghi .................. G06F 21/87 |
| | | | 726/34 |
| 2009/0043253 | A1 | 2/2009 | Podaima |
| 2009/0166417 | A1 * | 7/2009 | Dammann ............. G07C 13/00 |
| | | | 235/386 |
| 2011/0031985 | A1 * | 2/2011 | Johnson .................. G06F 21/86 |
| | | | 324/681 |
| 2021/0012037 | A1 * | 1/2021 | Finchelstein ........... G06F 21/64 |
| 2021/0044332 | A1 * | 2/2021 | Sorensen ................. H04B 5/73 |
| 2021/0350680 | A1 * | 11/2021 | Madden ................. G08B 13/06 |
| 2021/0389958 | A1 * | 12/2021 | Choi ..................... G06F 21/572 |
| 2022/0050838 | A1 * | 2/2022 | Piatetsky ............... G06Q 50/26 |

OTHER PUBLICATIONS

Grainger, #4-40 Tamper Resistant Screw, Round, One-Way, 18-8 (304) Stainless Steel, Plain, 3/8 in length, available on Internet prior to Jul. 23, 2021, 2 pgs.

Unline, Cable Seals, 1/16×12, Red, available on Internet prior to Jul. 23, 2021, 1 pg.

McMaster-Carr, Made To Order Pull Tight Loop Tamper Seal Tags, available on Internet prior to Jul. 23, 2021, 4 pgs.

NovaVision, Secure-Guard Security Labels, available on Internet prior to Jul. 23, 2021, 27 pgs.

* cited by examiner

SYSTEMS, TAMPER-EVIDENT ASSEMBLIES AND METHODS TO DETECT TAMPERING AND/OR PROVIDE CRYPTOGRAPHIC EVIDENCE OF TAMPERING

BACKGROUND OF THE INVENTION

The present disclosure relates to tamper evidence. More specifically, it provides systems and methods that detect tampering and provide strong evidence of tampering (if tampering occurs) without human interaction or oversight.

There is an on-going need to provide tamper evidence for a wide variety of systems, devices, containers, packaging, etc., in which confidentiality, security or chain of custody is a concern. Electronic voting systems are but one example of systems, which would benefit from tamper evident methods. Other examples include, but are not limited to, financial systems, military systems, information technology systems, etc.

There are currently many different ways to provide evidence of tampering. Common methods include tamper-evident seals, cables and cable ties, which are used to secure points of entry, such as seams, joints, plates, lids, screws, etc. In addition, tamper-resistant fasteners, such as tamper-resistant one-way screws and uniquely tooled screws, have also been used to provide evidence of tampering. In some cases, tamper-evident methods may be serialized to further discourage tampering by preventing replacement with a new seal, cable, cable tie or tamper-resistant fastener.

One problem with currently available tamper-evident methods is that human interaction or oversight is required to notice if a seal, cable, cable tie or tamper-resistant fastener has been tampered with (e.g., removed/replaced or removed/replaced with different new seal, cable, cable tie or tamper-resistant fastener). For example, tamper evident seals can be easily removed using chemicals and razor blades, and may be replaced using the same seal or a new seal. Even if the original seal was serialized, human oversight is needed to recognize that the original seal has been removed and replaced with the same seal or a new seal. Similar oversight is needed to recognize when tamper-evident cables, cable ties and tamper-resistant fasteners have been removed and replaced.

Another problem with currently available tamper-evident methods is that they can all be defeated, given enough time and expertise, sometimes without providing any evidence of tampering. For example, there are one-way screws and uniquely tooled screws currently on the market that profess to be "tamper-resistant" or "tamper-proof." These screws have uniquely tooled drives and/or heads that require custom tools to insert and/or remove. However, even these screws can be defeated given enough time and expertise (e.g., by customizing/altering a screwdriver using a Dremel tool, etc.).

Tamper-evident methods can generally be measured by the amount of time and level of expertise needed for a bad actor to gain access into a particular system, device, container, package, etc. The goal is not to prevent tampering (since most tamper-evident methods can be defeated given enough time and expertise), but rather to: 1) make it more difficult to gain access to the system, device, container, package, etc., so that tamper attempts take more time and 2) require a lot of expertise. Conventional tamper-evident methods do not automatically detect tamper events or provide strong evidence of tampering without human interaction or oversight.

SUMMARY OF THE INVENTION

The present disclosure provides improved systems and methods to detect tampering and/or provide evidence of tampering (if tampering occurs). More specifically, the present disclosure provides improved systems and methods that provide strong tamper evidence without human interaction or oversight. In the disclosed embodiments, tamper evidence is provided by incorporating at least one tamper-evident assembly within an enclosure. The enclosure may include one or more points of entry (e.g., seams, joints, plates, lids, etc.) for accessing an interior of the enclosure. As described in more detail below, the tamper-evident assembly includes a tamper-evident fastener, which is coupled to a surface of the enclosure to secure a point of entry on the enclosure. Unlike other tamper-evident fasteners, the tamper-evident fastener described herein includes an integrated circuit (IC) chip, which is embedded within the tamper-evident fastener and configured to transmit a data signal through the tamper-evident fastener when the tamper-evident fastener is coupled to the surface of the enclosure to secure the point of entry on the enclosure.

In the embodiments disclosed herein, at least one processing device is coupled to receive the data signal transmitted from the IC chip when the tamper-evident fastener is coupled to the surface of the enclosure. The at least one processing device is mounted on a printed circuit board (PCB), which may be included within the tamper-evident assembly and/or within a host device, which is either housed within or located outside of the enclosure.

In some embodiments, the at least one processing device may be configured to detect tampering and/or provide evidence of tampering when the data signal transmitted from the IC chip and conducted through the tamper-evident fastener is not received. For example, an attempt to remove the tamper-evident fastener from the surface of the enclosure may cause the tamper-evident fastener to break and/or may damage the IC chip embedded within the tamper-evident fastener. Damaging the tamper-evident fastener and/or the IC chip prevents the IC chip from transmitting the data signal to the at least one processing device, which in turn, enables the at least one processing device to detect tampering and/or provide evidence of tampering.

In other embodiments, the processing device may use cryptographic techniques to further strengthen tamper evidence. For example, the IC chip embedded within the tamper-evident fastener may store a unique identifier corresponding to the tamper-evident fastener, and may transmit the unique identifier through the tamper-evident fastener to the processing device when the tamper-evident fastener is coupled to the surface of the enclosure to secure a point of entry on the enclosure. Before the host device is in use, the unique identifier corresponding to the tamper-evident fastener may be detected by the processing device, hashed, encrypted and stored within non-volatile memory. When the host device is later used, the unique identifier may again be detected by the processing device (if the tamper-evident fastener is still securely coupled to the surface of the enclosure) and hashed. In some cases, the processing device may detect tampering and/or provide cryptographic evidence of tampering if the subsequent hash does not match the initial hash.

In a first embodiment, a system configured to detect tampering and/or provide cryptographic evidence of tampering is provided. The system comprises an enclosure comprising a point of entry for accessing an interior of the enclosure; a tamper-evident fastener coupled to a surface of the enclosure to secure the point of entry on the enclosure, wherein the tamper-evident fastener comprises an identification chip, which is embedded within the tamper-evident fastener and configured to: (a) store a unique identifier corresponding to the tamper-evident fastener, and (b) transmit the unique identifier through the tamper-evident fastener when the tamper-evident fastener is coupled to the surface of the enclosure; and a processing device coupled to receive the unique identifier transmitted from the identification chip when the tamper-evident fastener is coupled to the surface of the enclosure to secure the point of entry.

In one alternative of the first embodiment, the tamper-evident fastener is a screw, comprising: a screw head; and a screw body; wherein the identification chip is arranged within the screw and configured to transmit the unique identifier through the screw body when the screw is coupled to the surface of the enclosure to secure the point of entry. In another alternative the screw body comprises: a hollow outer body formed integrally with the screw head, the hollow outer body comprising an inner cavity extending from within the screw head to an opening formed within a distal end of the hollow outer body; and a solid inner body comprising an upper portion and a threaded middle portion arranged within the inner cavity of the hollow outer body, and a non-threaded lower portion extending out from the inner cavity; wherein the identification chip is arranged within the inner cavity of the hollow outer body above the upper portion of the solid inner body, and wherein the identification chip is configured to transmit the unique identifier through the solid inner body or the hollow outer body when the screw is coupled to the surface of the enclosure to secure the point of entry. In another alternative, the screw further comprises a sharp tip arranged near a surface of the identification chip, and wherein when the screw is unscrewed from the surface of the enclosure, the sharp tip moves up towards the surface of the identification chip, which causes the sharp tip to damage the identification chip and prevent the identification chip from transmitting the unique identifier to the processing device. In some alternatives, the screw further comprises a mechanical weak point, wherein when the screw is unscrewed from the surface of the enclosure, the mechanical weak point breaks to prevent the identification chip from transmitting the unique identifier to the processing device and enable the screw to be removed from the surface of the enclosure. In some alternatives, drilling into the screw head damages the identification chip and prevents the identification chip from transmitting the unique identifier to the processing device.

In an alternative of the first embodiment, the processing device is configured to detect tampering and/or provide evidence of tampering if the unique identifier is not received by the processing device. In some alternatives the system further comprises a host device housed within the enclosure. In some alternatives, the host device comprises a voting system or voting equipment. In some alternatives, the processing device is configured to detect unique identifiers received from the tamper-evident fastener before and after the host device is in use, and compare hashes of the unique identifiers detected before and after use to detect tampering and/or provide cryptographic evidence of tampering.

In first embodiment may also further comprise a plurality of tamper-evident fasteners, each having an identification chip embedded therein and configured to: (a) store a unique identifier corresponding to the tamper-evident fastener, and (b) transmit the unique identifier through the tamper-evident fastener when the tamper-evident fastener is coupled to the surface of the enclosure to secure the point of entry, wherein the processing device is coupled to receive the unique identifier from each tamper-evident fastener that is coupled securely to the surface. In first embodiment may also further comprising a printed circuit board (PCB) arranged within the enclosure and coupled to receive the plurality of tamper-evident fasteners when the plurality of tamper-evident fasteners are coupled to the surface of the enclosure to secure the point of entry. In some alternatives, during a commissioning phase before the host device is in use, the processing device is configured to receive location metadata, which specifies a location of each of the tamper-evident fasteners on the PCB. In other alternatives, when the host device is in use, the processing device is configured to utilize the location metadata, along with the unique identifiers received by the processing device, to detect tampering and identify a location of the tampering on the enclosure.

In an alternative of the first embodiment, during a commissioning phase before the host device is in use, the processing device is configured to execute a first set of program instructions to: detect the unique identifiers transmitted from the identification chips of the plurality of tamper-evident fasteners; collect the detected unique identifiers within a payload; apply a hash function to the payload to create a first hash; generate a digital signature by encrypting the first hash with a private key; and store the digital signature within a non-volatile memory included within the system. In one alternative, when the host device is booted, the processing device is configured to execute a second set of program instructions to: retrieve the digital signature stored within the non-volatile memory; decrypt the digital signature using a public key to obtain the first hash from the digital signature; detect the unique identifiers transmitted from the identification chips of each tamper-evident fastener that is coupled securely to the surface, wherein if a tamper-evident fastener is removed or damaged, the unique identifier corresponding to that tamper-evident fastener is not detected; collect the detected unique identifiers within a payload; apply a hash function to the payload to create a second hash; compare the second hash to the first hash; and detect tampering and/or provide cryptographic evidence of tampering if the second hash does not match the first hash.

In yet another alternative of the first embodiment, while the host device is in use, the processing device is configured to execute a third set of program instructions to: detect the unique identifiers transmitted from the identification chips of each tamper-evident fastener that is coupled securely to the surface, wherein if a tamper-evident fastener is removed or damaged, the unique identifier corresponding to that tamper-evident fastener is not detected; collect the detected unique identifiers within a payload; apply a hash function to the payload to create an additional hash; compare the additional hash to the first hash; and detect tampering and/or provide cryptographic evidence of tampering if the additional hash does not match the first hash. In some alternatives, if the additional hash matches the first hash, the processing device is configured to wait a period of time before re-executing the third set of program instructions.

In a second embodiment, a system configured to detect tampering and/or provide evidence of tampering is provided. The system comprises: a smart screw, comprising: a screw head; a screw body; and an identification chip arranged within the smart screw, wherein the identification chip is configured to: (a) store a unique identifier corresponding to the tamper-evident fastener, and (b) transmit the unique identifier through the screw body when the smart screw is coupled to the surface of the enclosure to secure the point of entry.

In one alternative of the second embodiment, the screw body comprises: a hollow outer body formed integrally with the screw head, the hollow outer body comprising an inner cavity extending from within the screw head to an opening formed within a distal end of the hollow outer body; and a solid inner body comprising an upper portion and a threaded middle portion arranged within the inner cavity of the hollow outer body, and a non-threaded lower portion extending out from the inner cavity; and wherein the identification chip is arranged within the inner cavity of the hollow outer body above the upper portion of the solid inner body.

The second embodiment may further comprise a processing device coupled to receive the unique identifier transmitted from the identification chip when the smart screw is coupled to the surface of the enclosure to secure the point of entry. In one alternative, the screw body comprises a sharp tip arranged near a lower surface of the identification chip, and wherein when the smart screw is unscrewed from the surface of the enclosure, the sharp tip damages the identification chip and prevents the identification chip from transmitting the unique identifier to the processing device. In another alternative, the screw body comprises a mechanical weak point, and wherein when the smart screw is unscrewed from the surface of the enclosure, the mechanical weak point breaks to prevent the identification chip from transmitting the unique identifier to the processing device and enable the smart screw to be removed from the surface of the enclosure. In another alternative, drilling into the screw head damages the identification chip and prevents the identification chip from transmitting the unique identifier to the processing device. In another alternative, the processing device is configured to detect tampering and/or provide evidence of tampering if the unique identifier is not received by the processing device. The second embodiment may also further comprise a host device housed within the enclosure, and wherein the processing device is configured to detect unique identifiers received from the identification chip before and after the host device is in use, and compare hashes of the unique identifiers detected before and after use to detect tampering and/or provide cryptographic evidence of tampering.

In a third embodiment, a method to detect tampering and/or provide cryptographic evidence of tampering of an enclosure, wherein the enclosure comprises a point of entry for accessing an interior of the enclosure is provided. The method may comprise coupling one or more tamper-evident fasteners to a surface of the enclosure to secure the point of entry on the enclosure, wherein each tamper-evident fastener comprises an identification chip, which is embedded within the tamper-evident fastener and configured to: (a) store a unique identifier corresponding to the tamper-evident fastener, and (b) transmit the unique identifier through the tamper-evident fastener when the tamper-evident fastener is coupled to the surface of the enclosure; receiving the unique identifiers transmitted from the identification chip of each tamper-evident fastener that is coupled securely to the surface, wherein if a tamper-evident fastener is removed or damaged, the unique identifier corresponding to that tamper-evident fastener is not detected; collecting the received unique identifiers within a payload; applying a hash function to the payload to create a second hash; comparing the second hash to a first hash previously created during a commissioning phase; and detecting tampering and/or providing cryptographic evidence of tampering if the second hash does not match the first hash.

In one alternative of the third embodiment, during the commissioning phase, the method further comprises: receiving the unique identifiers transmitted from the identification chips of the one or more tamper-evident fasteners; collecting the received unique identifiers within a payload; apply a hash function to the payload to create the first hash; generating a digital signature by encrypting the first hash with a private key; and storing the digital signature within a non-volatile memory.

The third embodiment may also further comprise retrieving the digital signature stored within the non-volatile memory; and decrypting the digital signature using a public key to obtain the first hash from the digital signature. In another alternative, if the second hash matches the first hash, the method further comprises: waiting a period of time; and repeating said receiving, said collecting, said applying, said comparing and said detecting. In still another alternative of the third embodiment, if the second hash does not match the first hash, the method further comprises generating a tamper alert. In some alternatives, said generating a tamper alert comprises generating an audible alert or a visual alert. The third embodiment may also further comprise transmitting the tamper alert to a system or device. In some alternatives of the third embodiment, in response to said generating a tamper alert comprises, the method further comprises one or more of the following: logging the tamper alert to record a tamper event; and blocking execution of a processing device included within the enclosure until the tamper alert is processed.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

Figure 1A:
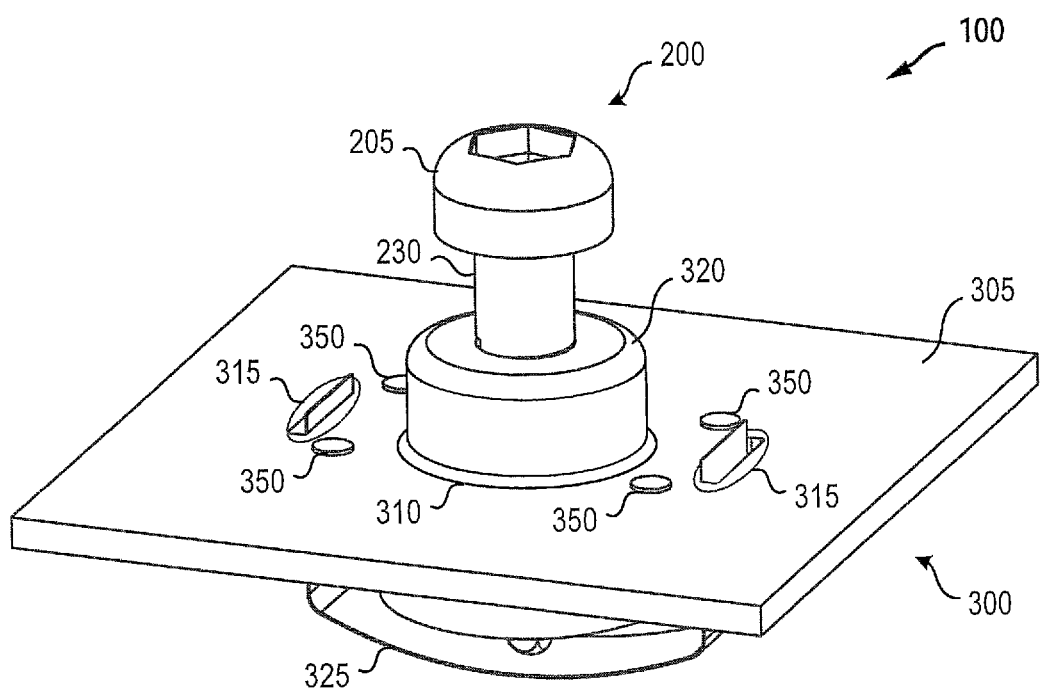
FIG. 1A is a three-dimensional (3D) perspective view of a tamper-evident assembly, including a tamper-evident fastener and a PCB sub-assembly, in accordance with one embodiment of the present disclosure.
Figure 1B:
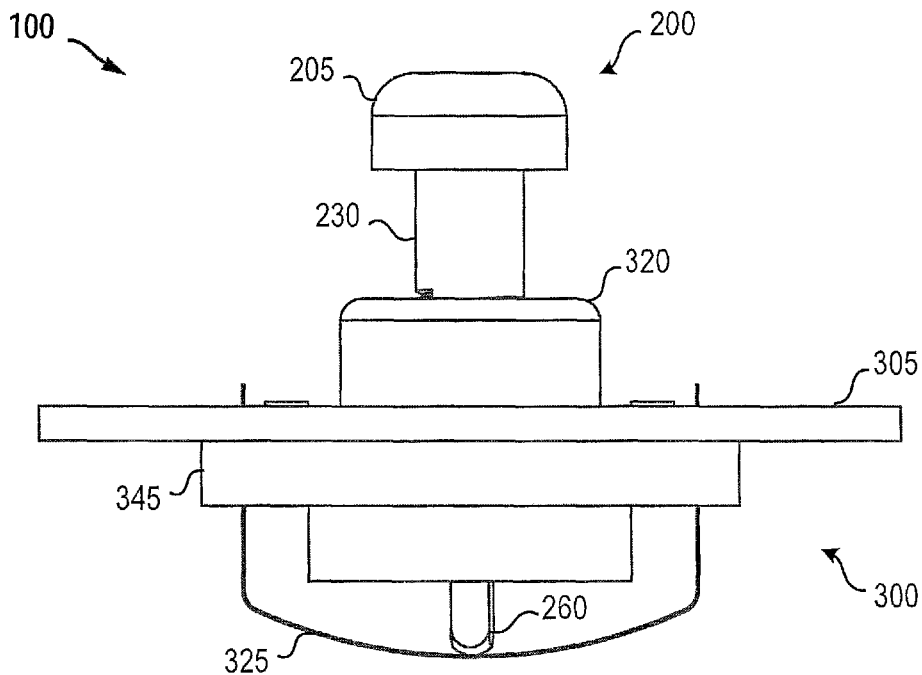
FIG. 1B is a side view of the tamper-evident assembly shown in FIG. 1A.

The present disclosure provides improved systems and methods to detect tampering and/or provide evidence of tampering (if tampering occurs). More specifically, the present disclosure provides improved systems and methods that provide strong tamper evidence without human interaction or oversight. In the disclosed embodiments, tamper evidence is provided by incorporating at least one tamper-evident assembly within an enclosure. The enclosure may include one or more points of entry (e.g., seams, joints, plates, lids, etc.) for accessing an interior of the enclosure. As described in more detail below, the tamper-evident assembly includes a tamper-evident fastener, which is coupled to a surface of the enclosure to secure a point of entry on the enclosure. Unlike other tamper-evident fasteners, the tamper-evident fastener described herein includes an integrated circuit (IC) chip, which is embedded within the tamper-evident fastener and configured to transmit a data signal through the tamper-evident fastener when the tamper-evident fastener is coupled to the surface of the enclosure to secure the point of entry on the enclosure.

In the embodiments disclosed herein, at least one processing device is coupled to receive the data signal transmitted from the IC chip when the tamper-evident fastener is coupled to the surface of the enclosure. The at least one processing device is mounted on a printed circuit board (PCB), which may be included within the tamper-evident assembly and/or within a host device, which is either housed within or located outside of the enclosure.

In some embodiments, the at least one processing device may be configured to detect tampering and/or provide evidence of tampering when the data signal transmitted from the IC chip and conducted through the tamper-evident fastener is not received. For example, an attempt to remove the tamper-evident fastener from the surface of the enclosure may cause the tamper-evident fastener to break and/or may damage the IC chip embedded within the tamper-evident fastener. Damaging the tamper-evident fastener and/or the IC chip prevents the IC chip from transmitting the data signal to the at least one processing device, which in turn, enables the at least one processing device to detect tampering and/or provide evidence of tampering.

The systems and methods disclosed herein improve tampering resistance and improve evidence of tampering (if tampering occurs) in a variety of different ways. For example, the systems and methods disclosed herein may be used to detect tampering and/or provide evidence of tampering without human interaction or oversight. In some embodiments, additional techniques may be used to further deter tampering and/or provide even stronger evidence of tampering.

In some embodiments, for example, an IC chip embedded within the tamper-evident fastener (e.g., an identification chip) may store a unique identifier corresponding to the tamper-evident fastener, and may transmit the unique identifier through the tamper-evident fastener to the processing device when the tamper-evident fastener is coupled to the surface of the enclosure to secure a point of entry on the enclosure. When the host device is in use, the processing device may continuously, periodically or intermittently attempt to detect the unique identifier transmitted from the IC chip embedded within the tamper-evident fastener. The unique identifier may be received and detected by the processing device when the tamper-evident fastener is securely coupled to the surface of the enclosure. The unique identifier is not detected if the tamper-evident fastener is removed from the surface of the enclosure or damaged. In some embodiments, the processing device may detect tampering and/or provide evidence of tampering if the unique identifier is not received from the tamper-evident fastener.

In other embodiments, the processing device may use cryptographic techniques to further strengthen tamper evidence. For example, the unique identifier corresponding to the tamper-evident fastener may be detected by the processing device, hashed, encrypted and stored within non-volatile memory before the host device is in use. When the host device is later used, the unique identifier may again be detected by the processing device (if the tamper-evident fastener is still securely coupled to the surface of the enclosure) and hashed. In some cases, the processing device may detect tampering and/or provide cryptographic evidence of tampering if the subsequent hash does not match the initial hash.

Although described above in the context of a single tamper-evident fastener, the cryptographic techniques described herein may generally be applied to one or more tamper-evident fasteners. In some embodiments, for example, the disclosed systems and methods may include a plurality of tamper-evident fasteners, each having an IC chip (or identification chip) which is embedded therein in and configured to: (a) store a unique identifier corresponding to the tamper-evident fastener, and (b) transmit the unique identifier through the tamper-evident fastener when the tamper-evident fastener is securely coupled to the surface of the enclosure to secure a point of entry on the enclosure. The processing device may be coupled to receive the unique identifier transmitted from the identification chip of each tamper-evident fastener, which is coupled securely to the surface of the enclosure.

Before the host device is in use, the processing device may detect the unique identifiers transmitted from the plurality of tamper-evident fasteners securely coupled to the surface of the enclosure. In addition, the processing device may collect the detected unique identifiers into a payload and apply a hash function to the payload to create a first hash, which may then be encrypted and stored within non-volatile memory.

When the host device is later in use, the processing device may again attempt to detect the unique identifiers transmitted from the plurality of tamper-evident fasteners. The processing device may detect the unique identifier transmitted from each tamper-evident fastener, which is securely coupled to the surface of the enclosure. If a tamper-evident fastener is removed from the surface of the enclosure or damaged, the unique identifier corresponding to that fastener is not detected by the processing device. The processing device may then collect the detected unique identifier(s) into a payload and apply a hash function to the payload to create a second hash, which may compared to the first hash after the first hash is retrieved from non-volatile memory and decrypted. In some cases, the processing device may detect tampering and/or provide cryptographic evidence of tampering if the second hash does not match the first hash.

The present disclosure contemplates a wide variety of tamper-evident fasteners, which may utilize the techniques described herein to improve tamper evidence. In some embodiments, the tamper-evident fastener described herein may be configured as a screw and the tamper-evident assembly may be configured to receive the screw when the screw is screwed securely into a surface of the enclosure to secure a point of entry on the enclosure. When configured as a screw, the tamper-evident fastener with embedded IC chip may be referred to herein as a "smart screw," and the tamper-evident assembly comprising the smart screw may be referred to herein as a "smart screw assembly." Although described below in the context of a smart screw, one skilled in the art would recognize how the techniques described herein could be applied to other types of fasteners. For example, the techniques described herein could be used to create tamper-evident bolts, pins, clips, nails, latches, ties, clamps, snaps, etc.

Figure 2A:
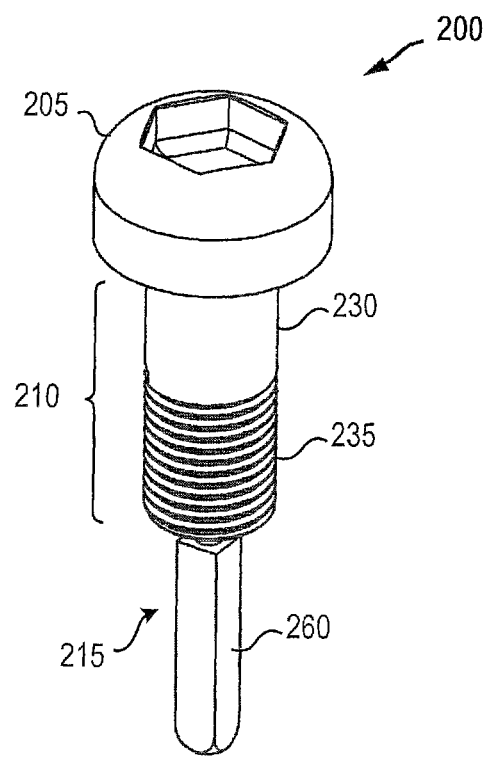
FIG. 2A is a 3D perspective view of a tamper-evident fastener in accordance with one embodiment of the present disclosure.
Figure 2B:
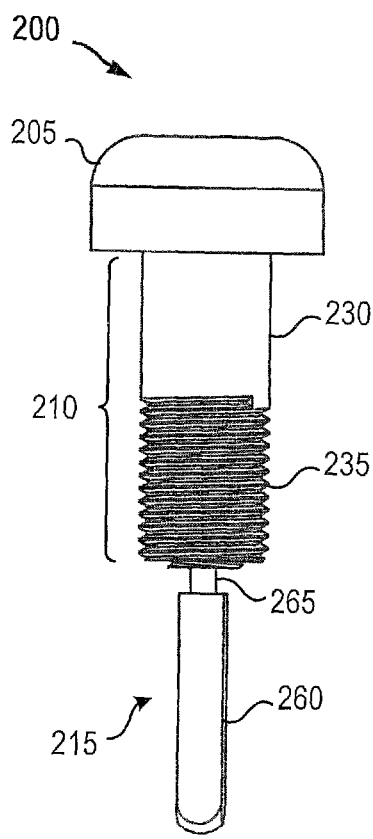
FIG. 2B is a side view of the tamper-evident fastener shown in FIG. 2A.
Figure 2C:
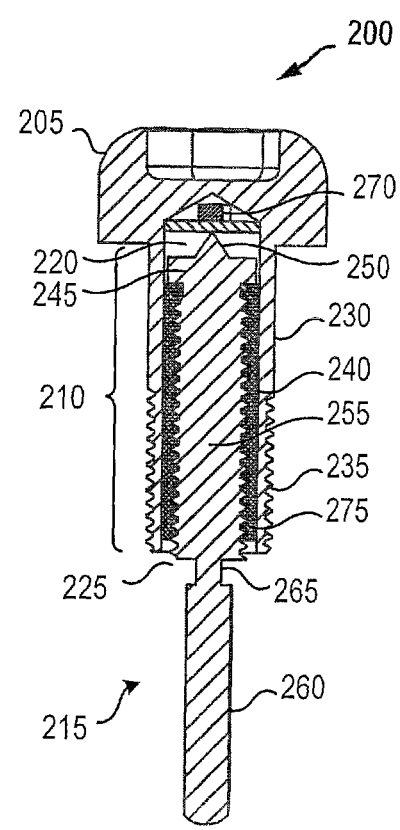
FIG. 2C is a cross-section view through the tamper-evident fastener shown in FIGS. 2A and 2B.
Figure 2D:
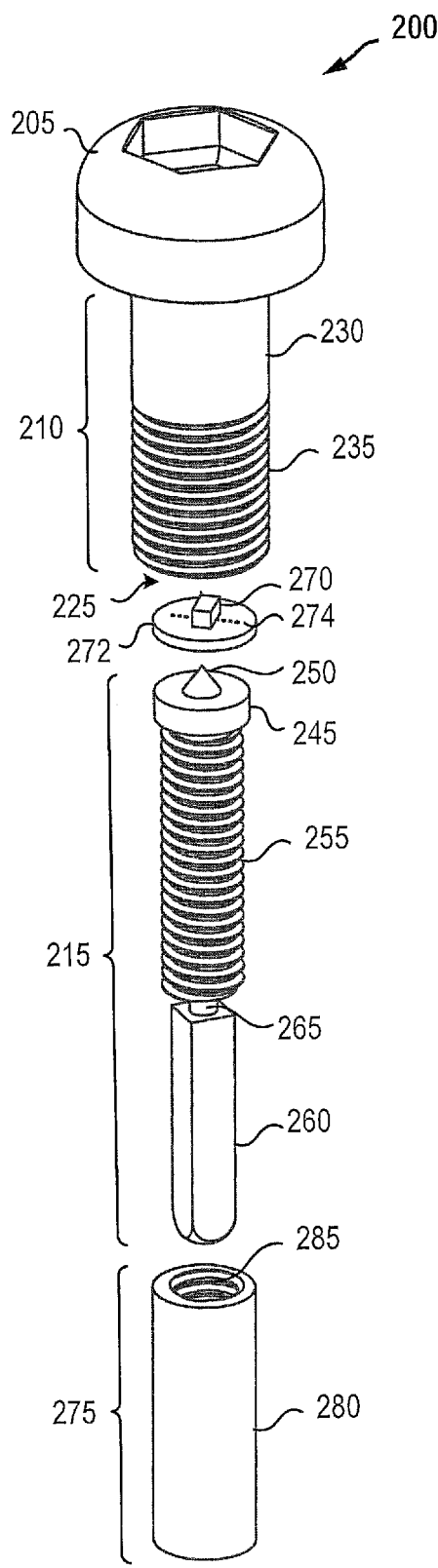
FIG. 2D is an exploded view of the tamper-evident fastener shown in FIGS. 1A-1C and FIGS. 2A-2C.
Figure 3:
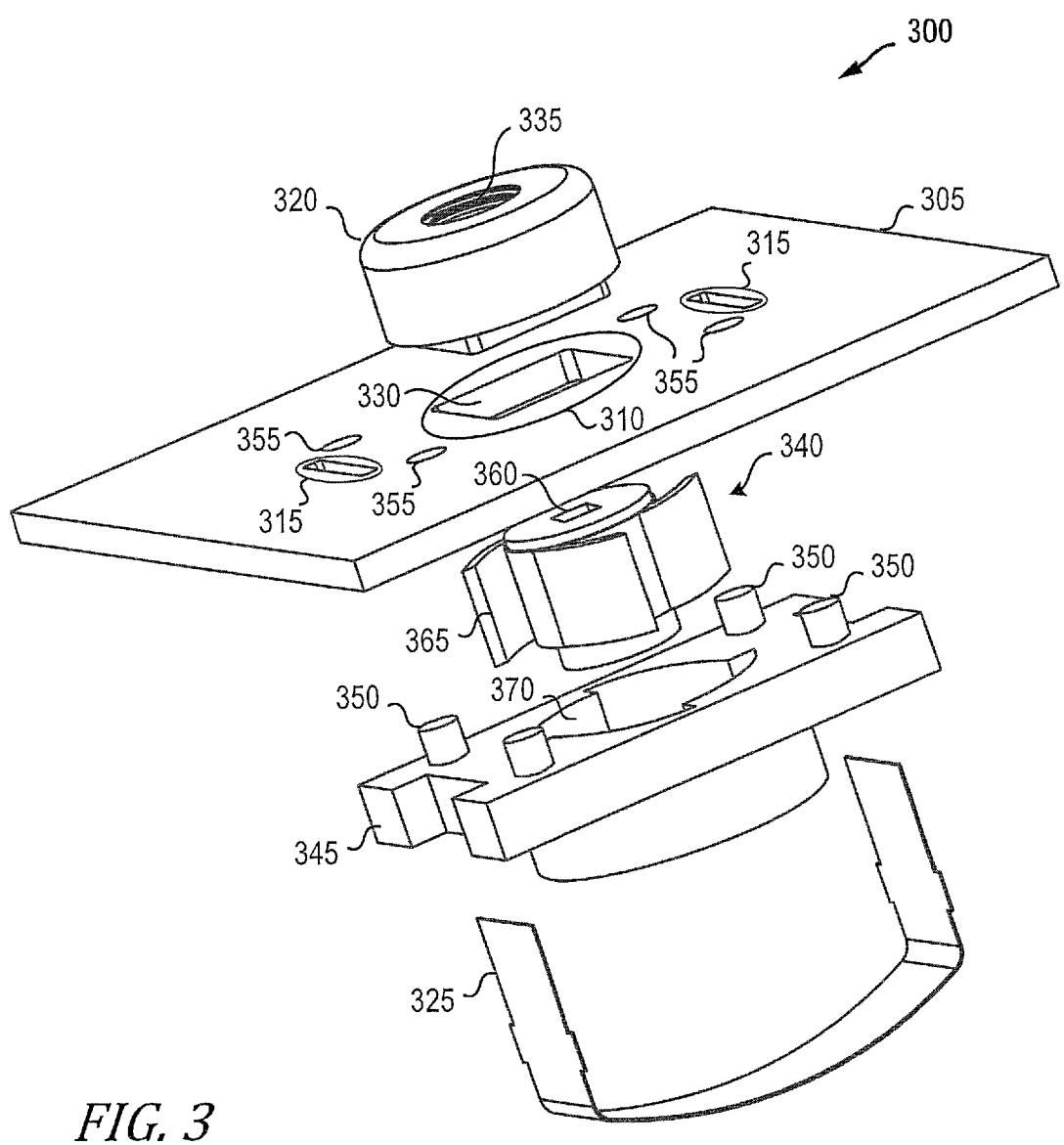
FIG. 3 is an exploded of the PCB sub-assembly shown in FIGS. 1A-1C.
Figure 4:
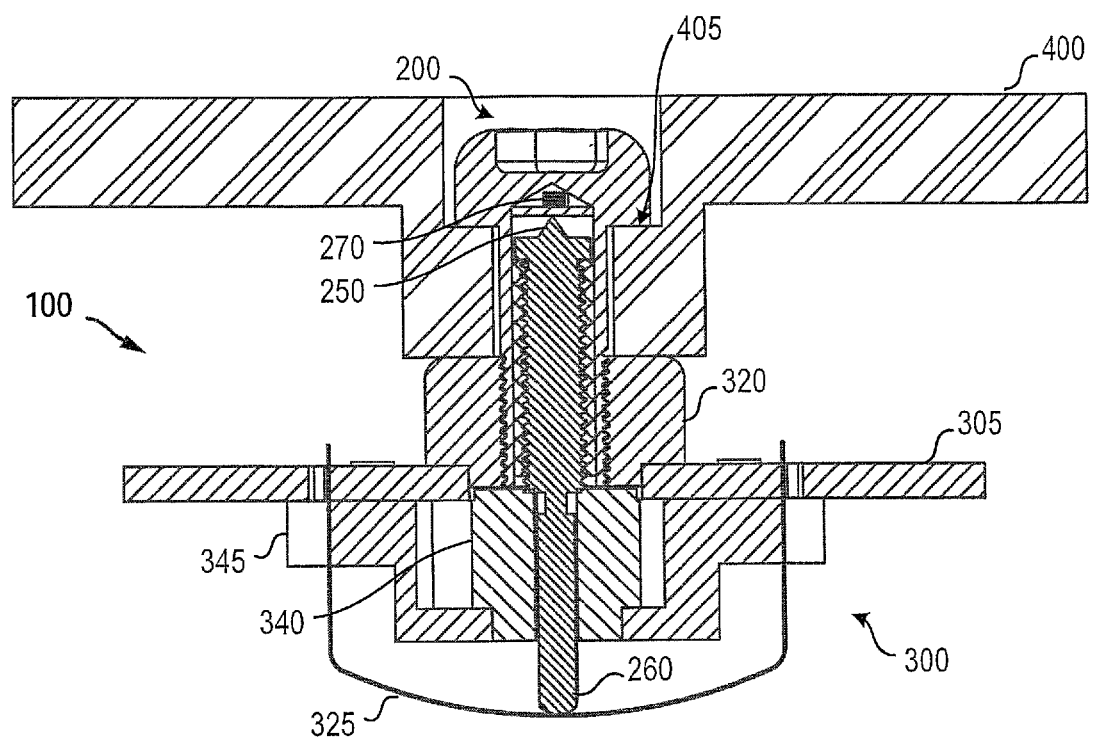
FIG. 4 is a cross-section view through the tamper-evident assembly shown in FIGS. 1A-1C when the tamper-evident fastener shown in FIGS. 1A-1C and 2A-2C is coupled to a surface of an enclosure to secure a point of entry on the enclosure.

FIGS. 1-4 illustrate one embodiment of a smart screw assembly in accordance with the present disclosure. For example, FIG. 1A provides a 3D perspective view of a smart screw assembly 100. FIG. 1B provides a side view of the smart screw assembly 100 shown in FIG. 1A. FIG. 1C provides a cross-section view through the smart screw assembly 100 shown in FIG. 1A when the smart screw 200 is coupled to a surface of an enclosure to secure a point of entry on the enclosure. As shown in FIGS. 1A-1C, the smart screw assembly 100 may generally include a smart screw 200 and a PCB sub-assembly 300. FIG. 2A provides a 3D perspective view of the smart screw 200. FIG. 2B provides a side view and FIG. 2C provides a cross-section view through the smart screw 200 shown in FIG. 2A. Exploded views of the smart screw 200 and the PCB sub-assembly 300 are respectively shown in FIG. 2D and FIG. 3. FIG. 4 is a cross-section view through the smart screw assembly 100 shown in FIGS. 1A-1C when the smart screw 200 is coupled to a surface 405 of an enclosure 400 to secure a point of entry on the enclosure.

As shown in FIGS. 1A-1C, 2A-2D and 4, the smart screw 200 may generally include a screw head 205 and a screw body comprising a hollow outer body 210 (or first portion) and a solid inner body 215 (or second portion). The hollow outer body 210 is formed integrally with the screw head 205 and includes an inner cavity 220 extending from within the screw head 205 to an opening 225 formed within a distal end of the hollow outer body 210. The hollow outer body 210 further includes a shank 230 extending from a lower surface of the screw head 205, a threaded outer surface 235 extending from a lower surface of the shank to the distal end of the hollow outer body, and a smooth inner surface 240 encompassing the inner cavity 220. In some embodiments, the threaded outer surface 235 of the hollow outer body 210 may include right-handed threads, which allow the smart screw 200 to be screwed into a surface in a clockwise direction. However, the threaded outer surface 235 of the hollow outer body 210 is not strictly limited to right-handed threads, and may alternatively include left-handed threads, which allow the smart screw 200 to be screwed into a surface in a counter-clockwise direction.

The solid inner body 215 includes an upper portion 245 having a sharp tip 250, a threaded middle portion 255 arranged within the inner cavity 220 of the hollow outer body 210 and a non-threaded lower portion 260 extending out from the inner cavity 220. A mechanical weak point 265 is arranged between the threaded middle portion 255 and the non-threaded lower portion 260 of the solid inner body 215.

As shown in FIGS. 1C, 2C, 2D and 4, the smart screw 200 further includes an integrated circuit (IC) chip 270, which is arranged within the inner cavity 220 of the hollow outer body 210 above the upper portion 245 of the solid inner body 215. In some embodiments, the IC chip 270 may be configured to transmit a ground signal to the hollow outer body 210 and a data signal to the solid inner body 215 of the smart screw 200 when the smart screw 200 is coupled to a surface of the enclosure 400 to secure a point of entry on the enclosure. For example, the IC chip 270 may be mounted on a miniature PCB 272 having an edge plated ground contact, which is frictionally engaged with the hollow outer body 210 to conduct the ground signal to the hollow outer body 210. Likewise, the sharp tip 250 of the solid inner body 215 may be connected to a contact on the underside of the miniature PCB to conduct the data signal to the solid inner body 215. Alternatively, IC chip 270 may be configured to transmit a data signal to the hollow outer body 210 and a ground signal to the solid inner body 215 of the smart screw 200 when the smart screw 200 is coupled to the surface of the enclosure 400.

In some embodiments, the data signal transmitted from the IC chip 270 may include a simple ping or a message. In other embodiments, the data signal may include a unique identifier corresponding to the smart screw 200. As used herein, a "unique identifier" may be a serial number, an alphanumeric string or any other data (e.g., a resistive value) that uniquely identifies the smart screw 200. In some embodiments, a plurality of smart screws 200 may be used coupled to a surface of the enclosure 400 to secure one or more points of entry on the enclosure, and each smart screw 200 may be provided with its own unique identifier.

Although an IC chip 270 is utilized herein to transmit a data signal through the smart screw 200 when the smart screw 200 is coupled to a surface of the enclosure 400 to secure a point of entry on the enclosure, the techniques described herein are not strictly limited to an integrated circuit chip. In other embodiments, a resistor, fuse, filament, etc., may be used in place of the IC chip 270 to transmit a data signal through the smart screw 200 when the smart screw 200 is coupled to a surface of the enclosure 400 to secure a point of entry on the enclosure, and to prevent the data signal from being received when the smart screw 200 is removed from the surface of the enclosure 400 or damaged.

Figure 1C:
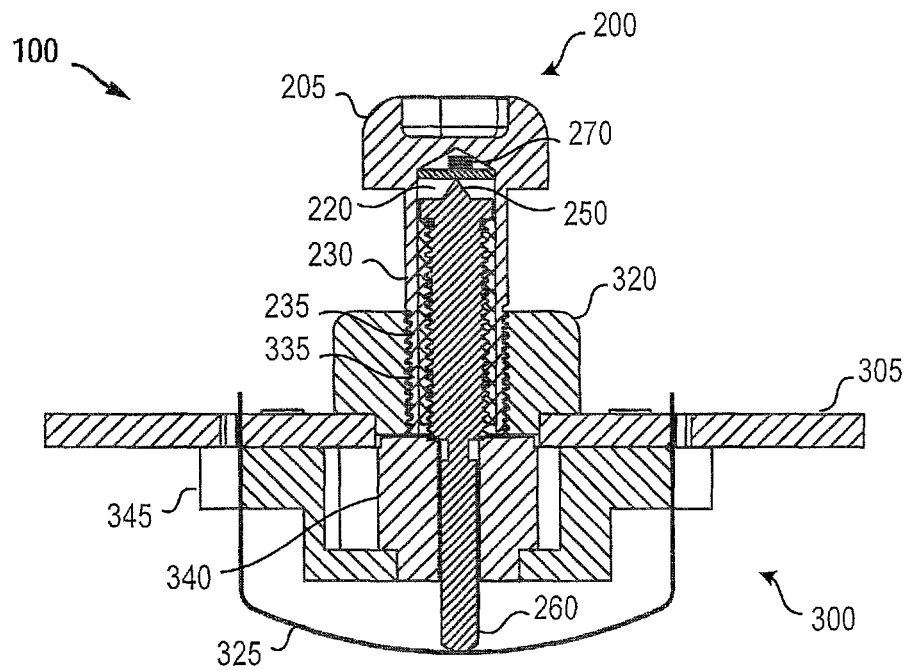
FIG. 1C is a cross-section view through the tamper-evident assembly shown in FIGS. 1A and 1B.

The hollow outer body 210 and the solid inner body 215 may be formed from electrically conductive materials (e.g., brass, aluminum, steel, etc.) for conducting the data and ground signals, which are transmitted from the IC chip 270 through the smart screw 200. In order to electrically isolate the data and ground signals, a dielectric sleeve 275 is provided between the hollow outer body 210 and the solid inner body 215. The dielectric sleeve 275 has a smooth outer surface 280 and a threaded inner surface 285. As shown in FIGS. 1C, 2C and 4, the smooth outer surface 280 of the dielectric sleeve 275 may be coupled to the smooth inner surface 240 of the hollow outer body 210, and the threaded inner surface 285 of the dielectric sleeve 275 may be coupled to the threaded middle portion 255 of the solid inner body 215, for electrically isolating the data signal from the ground signal.

As described in more detail below with reference to FIGS. 5A-5C, at least one processing device included within the enclosure 400 (e.g., processing device 515, 525 or 530) may be coupled to receive the data signal transmitted from the IC chip 270 when the smart screw 200 is coupled to the surface of the enclosure 400 to secure a point of entry on the enclosure. In some embodiments, the at least one processing device may detect tampering and/or provide evidence of tampering when the data signal from the IC chip 270 is not received. In other embodiments, the data signal may include a unique identifier corresponding to the smart screw 200, and the at least one processing device may detect tampering and/or provide evidence of tampering if the unique identifier is not received. In yet other embodiments, the at least one processing device detect one or more unique identifiers received from one or more smart screws 200 before and after a host device is in use, and may compare hashes of the unique identifiers detected before and after use to further strengthen tamper evidence.

The smart screw 200 shown in FIGS. 1A-1C, 2A-2D and 4 deters tampering in a variety of different ways. As shown in FIGS. 1C, 2C and 4, the sharp tip 250 of the solid inner body 215 is arranged near a lower surface of the IC chip 270. When attempts are made to unscrew the smart screw 200 from the surface of the enclosure 400, the solid inner body 215 of the smart screw 200 moves up towards the lower surface of the IC chip 270, which causes the sharp tip 250 to damage the IC chip 270 and prevent the IC chip 270 from transmitting the data signal to the processing device, thereby triggering tamper detection. In some embodiments, the mechanical weak point 265 provided within the solid inner body 215 may provide an amount of torque needed to puncture and damage the IC chip 270. The mechanical weak point 265 itself may also break, which may prevent: (a) the data signal from being transmitted to the processing device, and (b) enable the smart screw 200 to be removed without damaging the PCB sub-assembly 300. In some embodiments, the IC chip 270 may be mounted on a miniature PCB 272 having pre-drilled holes 274 for easy breakage.

The threaded middle portion 255 of the solid inner body 215 and the threaded inner surface 285 of the dielectric sleeve 275 have thread directions, which are opposite to the thread direction of the threaded outer surface 235 of the hollow outer body 210. For example, when the threaded outer surface 235 of the hollow outer body 210 is configured with right-handed threads to allow the smart screw 200 to be screwed into a surface in a clockwise direction, the threaded middle portion 255 of the solid inner body 215 and the threaded inner surface 285 of the dielectric sleeve 275 may be configured with left-handed threads. This allow the solid inner body 215 to rotate in a counter-clockwise direction and move up towards the lower surface of the IC chip 270 when the smart screw 200 is unscrewed from the surface. Alternatively, the threaded middle portion 255 of the solid inner body 215 and the threaded inner surface 285 of the dielectric sleeve 275 may be configured with right-handed threads when the threaded outer surface 235 of the hollow outer body 210 is configured with left-handed threads. When the smart screw 200 is unscrewed from the surface and the threaded middle portion 255 of the solid inner body 215 and the threaded inner surface 285 of the dielectric sleeve 275 are configured with right-handed threads, the solid inner body 215 rotates in a clockwise direction to move up towards the lower surface of the IC chip 270 and damage the IC chip.

Other attempts to remove the smart screw 200 may damage the smart screw 200 and/or the IC chip 270, thereby preventing the IC chip 270 from transmitting the data signal to the processing device. For example, when an attempt is made to remove the smart screw 200 by drilling out the screw head 205, the IC chip 270 embedded within the screw head 205 may be damaged. In such a case, the processing device may detect tampering and/or provide evidence of tampering when the data signal from the IC chip 270 is not received.

PCB sub-assembly 300 is configured to receive the smart screw 200 when the smart screw 200 is coupled to the surface of the enclosure 400 to secure a point of entry on the enclosure. As shown in FIGS. 1A-1C, 3 and 4, the PCB sub-assembly 300 may generally include a PCB 305 having a first electrical contact 310 and a second electrical contact 315 formed thereon, a fastener standoff 320 and a spring contact 325. In some embodiments, the first electrical contact 310 may be coupled to receive the ground signal and the second electrical contact 315 may be coupled to receive the data signal, which are transmitted from the IC chip 270 through the smart screw 200 when the smart screw 200 is coupled to the surface of the enclosure 400.

The fastener standoff 320 is mounted within a hole 330 formed within the PCB 305 and electrically connected to the first electrical contact 310. When the smart screw 200 is coupled to the surface, the threaded outer surface 235 of the hollow outer body 210 is physically and electrically connected to a threaded inner surface 335 of the fastener standoff 320 for transmitting the ground signal to the first electrical contact 310.

The spring contact 325 is mounted below the hole 330 formed within the PCB 305 and electrically connected to the second electrical contact 315. When the smart screw 200 is coupled to the surface, the non-threaded lower portion 260 of the solid inner body 215 is physically and electrically connected to the spring contact 325 for transmitting the data signal to the second electrical contact 315. When the smart screw 200 is removed from the surface or damaged, the electrical connection between the non-threaded lower portion 260 of the solid inner body 215 and the spring contact 325 breaks, which prevents the IC chip 270 from transmitting the data signal to the second electrical contact 315.

As shown in FIGS. 1C, 3 and 4, the PCB sub-assembly 300 may further include a ratchet wheel 340, which is mounted below the hole 330 formed within the PCB 305 and configured to receive the non-threaded lower portion 260 of the solid inner body 215. In the illustrated embodiment, the ratchet wheel 340 is mounted within a ratchet body 345, which is coupled to an underside of the PCB 305. As shown in FIGS. 1A and 3, the ratchet body 345 includes a number of protrusions 350 (e.g., four), which may be inserted within and coupled to holes 355 formed within the PBC 305 to attach the ratchet body 345 to the underside of the PCB 305. Although shown as a separate ratchet body 345, which is coupled to an underside of the PCB 305, a cut-out or hole formed within the PCB 305 may alternatively be used as a ratchet body.

As shown in FIG. 3, the ratchet wheel 340 includes a center hole 360 for receiving the non-threaded lower portion 260 of the solid inner body 215, and teeth 365 that engage with notches 370 formed within the ratchet body 345. The teeth 365 and notches 370 allow the ratchet wheel 340 to rotate in one direction (e.g., the clockwise direction) and prevent the ratchet wheel 340 from rotating in the opposite direction (e.g., the counter-clockwise direction). Together, the ratchet wheel 340 and the ratchet body 345 provide an example of a "one-way rotation stop mechanism," which allows the ratchet wheel and the solid inner body 215 to rotate freely in one direction and prevents rotation in the opposite direction. Other one-way rotation stop mechanisms may also be utilized.

When the smart screw 200 is screwed into the surface of the enclosure 400, ratchet wheel 340 rotates in one direction (e.g., the clockwise direction), which allows the solid inner body 215 and the hollow outer body 210 to rotate together (i.e., in the same direction). When the smart screw 200 is unscrewed from the surface of the enclosure 400, ratchet wheel 340 prevents the solid inner body 215 from rotating in the opposite direction (e.g., the counter-clockwise direction). Preventing the solid inner body 215 from rotating in the opposite direction causes the solid inner body 215 to move up towards the lower surface of the IC chip 270, which in turn, causes the sharp tip 250 of the solid inner body 215 to damage the IC chip 270 and prevent the IC chip 270 from providing the data signal to the second electrical contact 315. When the solid inner body 215 can move no further, additional counter-clockwise rotation of the hollow outer body 210 causes excessive torque in the solid inner body 215, which causes the mechanical weak point 265 to break and prevents damage to the ratchet wheel 340.

The smart screw assembly 100 shown in FIGS. 1-4 is merely one example of a tamper-evident assembly, which may be incorporated within an enclosure 400 to deter tampering and/or provide evidence of tampering (if tampering occurs). Although an exemplary embodiment is shown in FIGS. 1-4 and described herein, the techniques described herein are not strictly limited to such an embodiment. In other embodiments, the smart screw 200 and/or the PCB sub-assembly 300 may be configured differently while still utilizing the techniques described herein. For example, rather than use of the smart screw 200, any of a wide range of other fasteners may be utilized, including those described above. In another example, the ratchet wheel 340 and ratchet body 345 may be replaced with another "one-way rotation stop mechanism," which allows the solid inner body 215 to rotate freely in one direction and prevents rotation in the opposite direction. Further, rather than a PCB sub-assembly, as shown in FIGS. 1A-1C, 3 and 4, other sub-assemblies such as substrates, structural members, etc. may be used to receive the smart screw 200. One skilled in the art having the benefit of this disclosure would readily understand how the techniques described herein could be utilized to create a wide variety of tamper-evident fasteners and a wide variety of PCB sub-assemblies for receiving the various embodiments of tamper-evident fasteners.

Figure 5A:
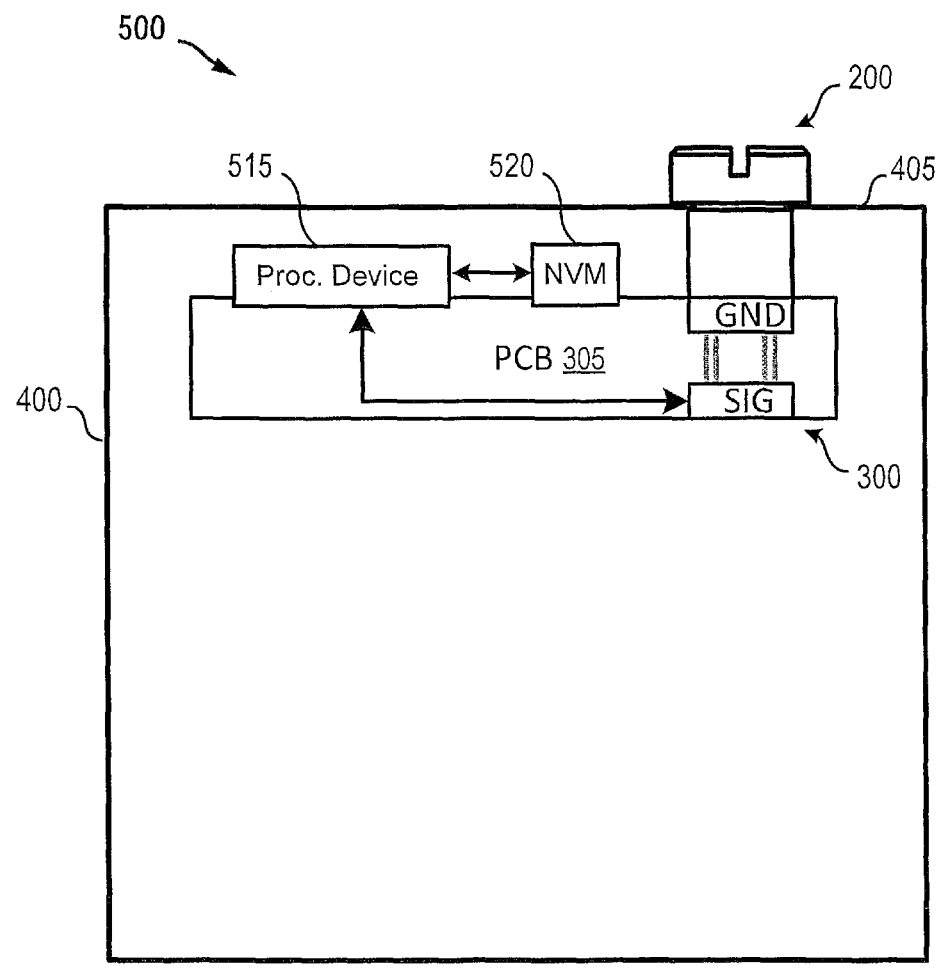
FIG. 5A is a block diagram illustrating a first embodiment of a system comprising an enclosure, at least one tamper-evident assembly and a processing device.
Figure 5B:
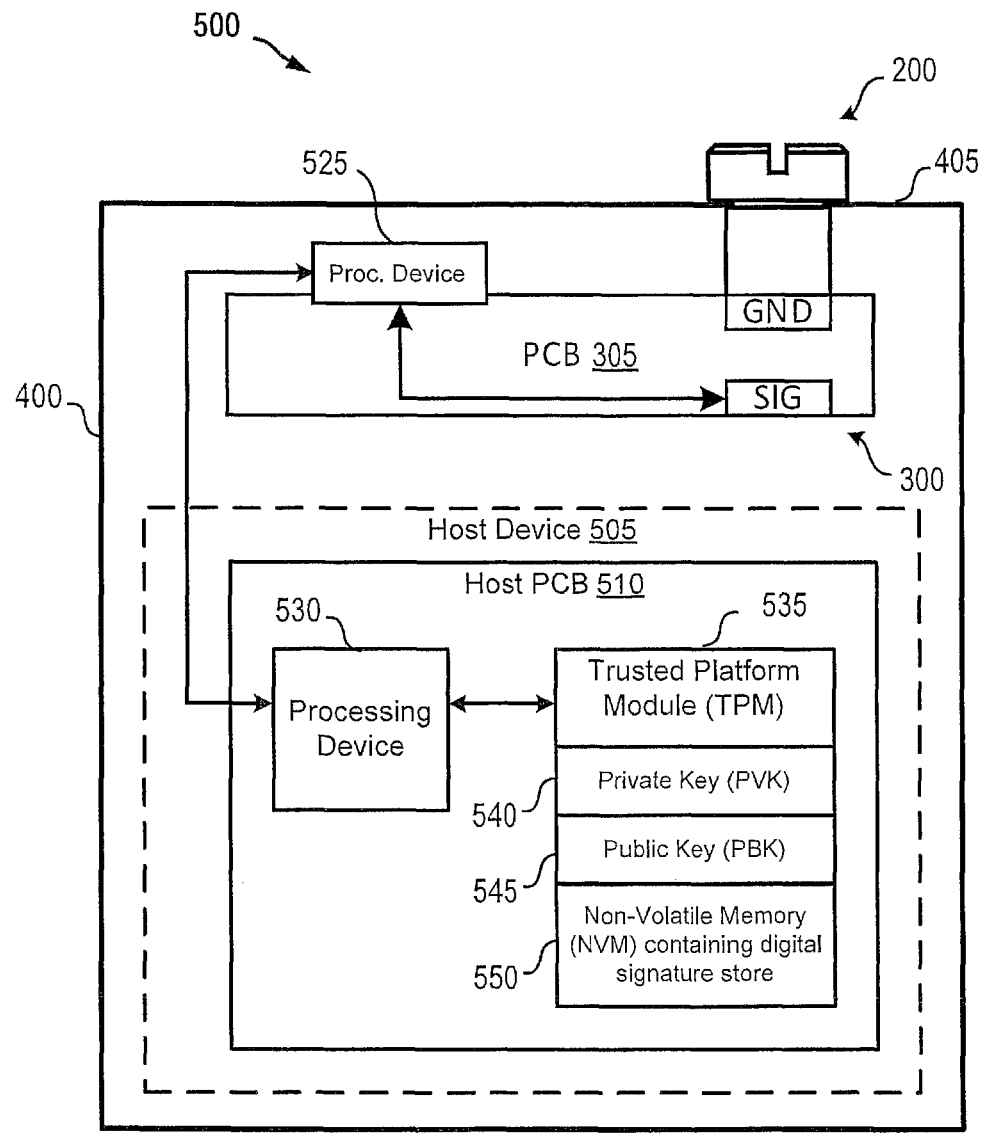
FIG. 5B is a block diagram illustrating a second embodiment of a system comprising an enclosure, at least one tamper-evident assembly and at least one processing device.
Figure 5C:
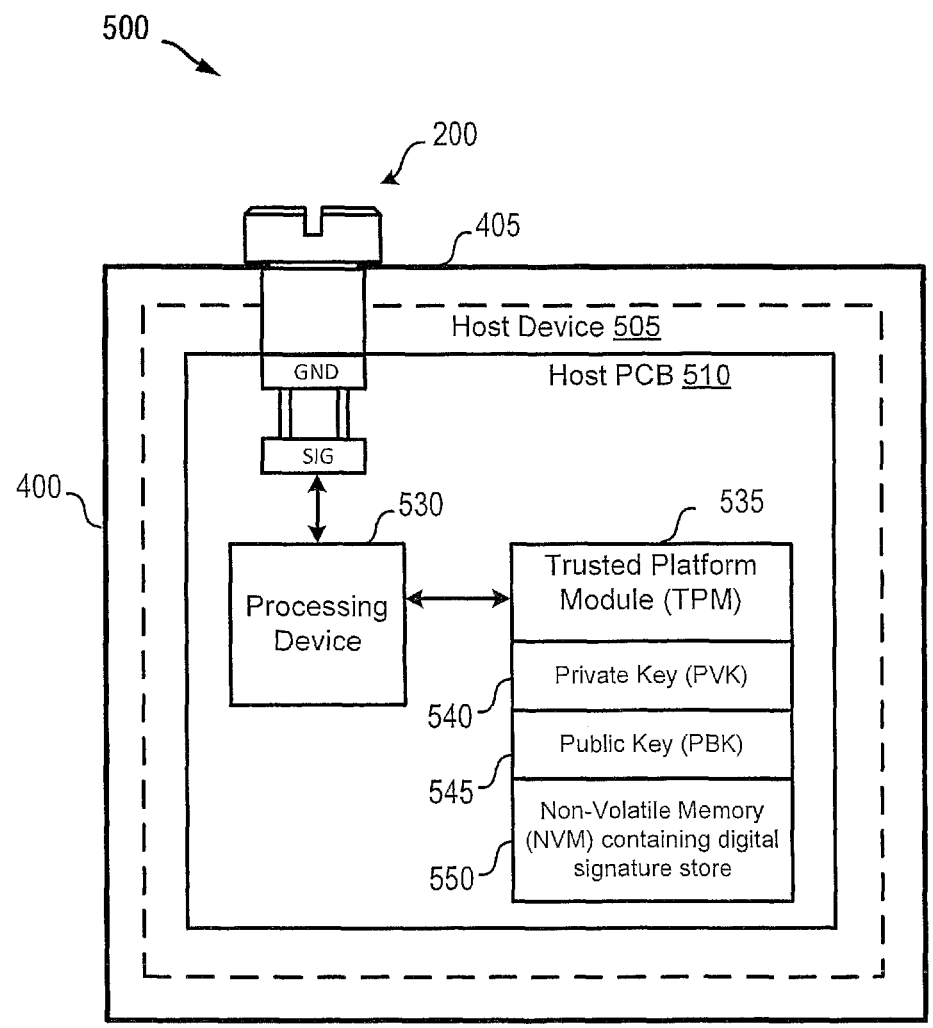
FIG. 5C is a block diagram illustrating a third embodiment of a system comprising an enclosure, at least one tamper-evident assembly and at least one processing device.

FIGS. 5A-5C illustrate various embodiments of a system 500 in accordance with the present disclosure. In FIG. 5A, for example, the system 500 includes an enclosure 400, which includes at least one point of entry (e.g., a seam, joint, plate, lid, etc.) for accessing an interior of the enclosure. In the embodiment shown in FIG. 5A, the enclosure 400 may include a wide variety of containers that would benefit from improved tamper resistance and/or have a need for providing strong tamper evidence when tampering attempts are made to improperly access the enclosure. For example, the enclosure 400 may include a wide variety of medical, financial, corporate, government or military containers. In one example embodiment, the enclosure 400 shown in FIG. 5A may be a ballot box, which is used to receive and securely store marked paper ballots deposited by voters in an election.

In the embodiments shown in FIGS. 5B-5C, the system 500 includes a host device 505 (or host device electronics) and an enclosure 400, which houses within the host device 505 and includes at least one point of entry (e.g., a seam, joint, plate, lid, etc.) for accessing an interior of the enclosure. In the embodiment shown in FIGS. 5B and 5C, the enclosure 400 may be a housing or chassis of the host device 505. Host device 505 may include a wide variety of systems or devices that would benefit from improved tamper resistance and/or have a need for providing strong tamper evidence when tampering attempts are made to improperly access the host device 505 or components within the host device 505. For example, host device 505 may include a wide variety of medical, financial, corporate, government or military systems or devices. In one example embodiment, host device 505 may be a voting system or voting equipment, which may be used in an election. Examples of voting systems and voting equipment include, but are not limited to, hand counted paper ballot systems, optical scan paper ballot systems, direct recording electronic (DRE) systems, hybrid paper/electronic voting systems, etc. Examples of voting equipment includes, but is not limited to, ballot marking devices, voting devices, voting terminals, voter interface devices, accessibility interfaces, tabulation devices, auditing devices, scanning devices, printing devices, etc.

In order to improve tamper resistance and/or provide strong tamper evidence, the system 500 embodiments shown in FIGS. 5A-5C include at least one tamper-evident assembly and at least one processing device. For example, the system 500 may include at least one smart screw assembly 100, as shown in FIGS. 1-4. Although a smart screw assembly 100 is shown in FIGS. 5A-5C, other tamper-evident assemblies utilizing the techniques described herein may be used within the system 500 to improve tamper resistance and/or provide strong tamper evidence. In addition, although a smart screw assembly 100 having only one smart screw 200 is shown in FIGS. 5A-5C, the system 500 described herein may alternatively include one or more smart screw assemblies 100 each having one or more smart screws 200.

As noted above and shown in FIGS. 5A-5C, the smart screw assembly 100 includes a smart screw 200 (or another tamper-evident fastener), which is coupled to a surface 405 of the enclosure 400 to secure a point of entry on the enclosure. Unlike conventional tamper-evident fasteners, the smart screw 200 shown and described herein includes an IC chip 270, which is embedded within the smart screw 200 and configured to transmit a data signal (SIG) and a ground signal (GND) through the smart screw 200 when the smart screw 200 is securely coupled to the surface 405 of the enclosure 400 to secure a point of entry on the enclosure.

In the embodiments shown in FIGS. 5A-5C, at least one processing device is provided within the enclosure 400 and coupled to receive the data signal (SIG) transmitted from the IC chip 270 when the smart screw 200 is securely coupled to the surface 405 of the enclosure 400. In some embodiments, the at least one processing device may detect tampering and/or provide evidence of tampering when the data signal (SIG) transmitted from the IC chip 270 and conducted through the smart screw 200 is not received by the at least one processing device. For example, an attempt to remove the smart screw 200 from the surface 405 of the enclosure 400 may cause the smart screw 200 to break and/or may damage the IC chip 270 embedded within the smart screw 200. As noted above, damaging the smart screw 200 and/or the IC chip 270 prevents the IC chip 270 from transmitting the data signal to the at least one processing device, which in turn, enables the at least one processing device to detect tampering and/or provide evidence of tampering.

In the present disclosure, the at least one processing device may be mounted on a printed circuit board (PCB), which is: (a) included within the smart screw assembly 100 (e.g., PCB 305) and/or (b) included within the host device 505 (e.g., host PCB 510). In the embodiment shown in FIG. 5A, processing device 515 is mounted on the PCB 305, which is included within the PCB sub-assembly 300 of the smart screw assembly. Processing device 515 may include a wide variety of processing devices including, but not limited to, programmable integrated circuits (e.g., a processor, controller, microcontroller, microprocessor, application specific integrated circuit "ASIC," etc.) and programmable logic devices (such as a field programmable gate array "FPGA", complex programmable logic device "CPLD", etc.). In one embodiment, processing device 515 may be implemented as a microcontroller unit (MCU).

As shown in FIG. 5A, processing device 515 is coupled to receive the data signal (SIG) transmitted from/through the smart screw 200 when the smart screw 200 is securely coupled to the surface 405 of the enclosure 400 to secure a point of entry on the enclosure. In some embodiments, processing device 515 may detect tampering and/or provide evidence of tampering when the data signal (SIG) transmitted from/through the smart screw 200 is not received. In other embodiments, the data signal (SIG) may include a unique identifier corresponding to the smart screw 200 (e.g., a serial number, alphanumeric string or any other data that uniquely identifies the smart screw 200), and processing device 515 may detect tampering and/or provide evidence of tampering if the unique identifier is not received.

In yet other embodiments, processing device 515 may detect unique identifiers received from one or more smart screws 200 before and after the enclosure 400 is used in the field (in one example, before/after a ballot box or other voting device is used in an election), and may compare hashes of the unique identifiers detected before and after use to further strengthen tamper evidence. For example, processing device 515 may detect the unique identifiers transmitted from one or more smart screws 200 during a commissioning phase before the enclosure 400 is used in the field. Once detected, processing device 515 may collect the detected unique identifiers into a payload and apply a hash function to the payload to create a first hash, which may be encrypted and stored within non-volatile memory (NVM) 520 as a digital signature. NVM 520 may include substantially any form of non-volatile memory, including but not limited to, NV random access memory (NVRAM), read only memory (ROM), Flash memory, etc. In some embodiments, NVM 520 may be a cryptographically secure non-volatile memory. In one example, NVM 520 may be password protected to secure the digital signature(s) stored therein. It is recognized that the techniques are not limited to the specific examples listed and other forms of non-volatile memory and/or cryptographic processors comprising non-volatile memory (e.g., a trusted platform module) may be utilized to store the digital signature(s), the first hash, a hash of the individual unique identifiers or unique identifiers, themselves.

When the enclosure 400 is later used, processing device 515 may again attempt to detect the unique identifiers transmitted from the one or more smart screws 200. The processing device 515 may detect the unique identifier transmitted from each smart screw 200, which is securely coupled to the surface 405 of the enclosure 400. If a smart screw 200 is removed from the surface 405 of the enclosure 400 or damaged, the unique identifier corresponding to that smart screw is not detected by processing device 515. Once detected, processing device 515 may collect the detected unique identifier(s) into a payload and apply a hash function to the payload to create a second hash, which may be compared to the first hash after the first hash is retrieved from NVM 520 and decrypted. In some cases, processing device 515 may detect tampering and/or provide cryptographic evidence of tampering if the second hash does not match the first hash.

The embodiment shown in FIG. 5B includes two processing devices. For example, a first processing device 525 mounted on PCB 305 is coupled between the smart screw 200 and a second processing device 530, which is mounted on the host PCB 510 included within host device 505. The first processing device 525 is coupled to receive the data signal (SIG) transmitted from/through the smart screw 200 (when the smart screw 200 is securely coupled to the surface 405 of the enclosure 400) and configured to communicate the data signal to the second processing device 530. In some embodiments, the first processing device 525 may be implemented with an interface controller and the second processing device 530 may be implemented with various forms of processing devices, as mentioned above. In one embodiment, the first processing device 525 may be a specialized interface chip (e.g., a USB to one-wire interface chip) or an interface adapter built on discrete components, and the second processing device 530 may be a central processing unit (CPU) or another processing device included within the host device 505.

In the embodiment shown in FIG. 5B, the second processing device 530 receives the data signal (SIG), which is transmitted from the smart screw 200 and communicated to the second processing device 530 via the first processing device 525. As noted above, the data signal (SIG) may include one or more unique identifiers transmitted from one or more smart screws 200, which are securely coupled to the surface 405 of the enclosure 400. In the embodiment shown in FIG. 5B, the second processing device 530 detects the unique identifiers received from the smart screw(s) 200 before and after the host device 505 is used in the field (e.g., before/after a voting system or voting equipment is used in an election), and compares hashes of the unique identifiers detected before and after use to further strengthen tamper evidence. For example, the second processing device 530 may detect the unique identifiers transmitted from the smart screw(s) 200 during a commissioning phase before the host device 505 is used in the field.

In some embodiments, the second processing device 530 may collect the detected unique identifiers into a payload and apply a hash function to the payload to create a first hash, which may be encrypted and stored within non-volatile memory as a digital signature. Unlike the embodiment shown in FIG. 5A, the second processing device 530 may utilize a trusted platform module (TPM) 535 included on the host PCB 510 to hash, encrypt and store the digital signature. As shown in FIG. 5B, TPM 535 may include a private key (PVK) 540 for encrypting the first hash, a public key (PBK) 545 for decrypting the first hash and a non-volatile memory (NVM) 550 for storing the digital signature. NVM 550 may include substantially any form of cryptographically secure non-volatile memory, including but not limited to, NVRAM, ROM, Flash memory, etc.

Although cryptographically secure non-volatile memory may be preferred, in at least one embodiment, the digital signature generated by the TPM 535 may also be stored in other forms of persistent memory. For example, the digital signature may be additionally or alternatively stored within a computer readable storage device (e.g., a hard disk drive, a solid state drive, a DVD, etc.), which may be included within or coupled to the host device 505.

It is noted that the second processing device 530 and the TPM 535 are provided herein merely as examples of processing devices that may be used to generate a digital signature, as set forth above. However, other processing devices (not shown herein) may also be used to generate a digital signature from the unique identifiers received from the smart screw(s) 200. It further is noted that a digital signature may not be generated in all embodiments. In some embodiments, the second processing device 530, the TPM 535 or another processing device (not shown) may store: (a) a hash of the aggregated unique identifiers (i.e., the first hash), (b) individual hashes of each unique identifier detected from a smart screw 200, and/or (c) the unique identifiers within the non-volatile memory. In some embodiments, the second processing device 530, the TPM 535 or another processing device (not shown) may also store zone information (or location metadata), which identifies the locations of each smart screw 200 coupled to the PCB 305, within the non-volatile memory. Thus, a particular zone or access point of specific tampering may be identified, logged, and/or tracked.

When the host device 505 is later used (e.g., when the host device 505 is booted and/or used in the field), the second processing device 530 may again attempt to detect the unique identifiers transmitted from the one or more smart screws 200. Like the previous embodiment, the second processing device 530 may detect the unique identifier transmitted from each smart screw 200, which is securely coupled to the surface 405 of the enclosure 400. If a smart screw 200 is removed from the surface 405 of the enclosure 400 or damaged, the unique identifier corresponding to that smart screw is not detected by the second processing device 530. Once detected, the second processing device 530 may collect the detected unique identifier(s) into a payload and apply a hash function to the payload to create a second hash, which may be compared to the first hash after the first hash is retrieved from NVM 550 and decrypted using, for example, the public key 545 stored within the TPM 535. In some embodiments, the second processing device 530 may detect tampering and/or provide cryptographic evidence of tampering if the second hash does not match the first hash. In other embodiments, cryptographic functionality may be omitted and the second processing device 530 may detect tampering and/or provide evidence of tampering if the data signal (SIG) or one or more unique identifiers are not received.

In the embodiment shown in FIG. 5C, PCB 305 is omitted and the smart screw 200 and PCB sub-assembly components are coupled directly to the host PCB 510. Otherwise, the system 500 shown in FIG. 5C is similar to the system 500 shown in FIG. 5B and described above.

In some embodiments, the system 500 shown in FIGS. 5A-5C may include a plurality of smart screws 200, which are coupled to the surface 405 of the enclosure 400 to secure one or more points of entry on the enclosure 400. Each smart screw 200 may be provided with its own unique identifier. Providing each smart screw 200 with its own unique identifier may improve tamper evidence in a variety of ways. As noted above, for example, the unique identifiers detected from each smart screw 200 securely coupled to the surface 405 of the enclosure 400 may be collected into a payload and hashed before/after the host device 505 is used to detect tampering and/or provide cryptographic evidence of tampering.

In some embodiments, providing each smart screw 200 with its own unique identifier may enable the processing device 525/530 to not only detect tampering, but to also identify a specific zone or access point on the enclosure 400 that was tampered with. For example, the processing device 525/530 can be aware of the location of each smart screw 200 on the PCB 305/510, based on location metadata that specifies the location of each smart screw 200 on the PCB 305/510. The location metadata may be provided to the processing device 525/530 electrically (e.g., through pin assignment) or logically (e.g., through manual assignment of each smart screw to a specific location) during a commissioning process before the host device 505 is in use. When the host device 505 is later used, the processing device 525/530 may utilize the location metadata, along with the unique identifiers, to detect tampering and identify a location of the tampering on the enclosure 400. For example, the processing device 525/530 may use: (a) the unique identifiers received by the processing device 525/530 to detect tampering of one or more of the smart screws 200, and (b) the location metadata to identify a specific zone or access point on the enclosure 400 that was tampered with.

Figure 6:
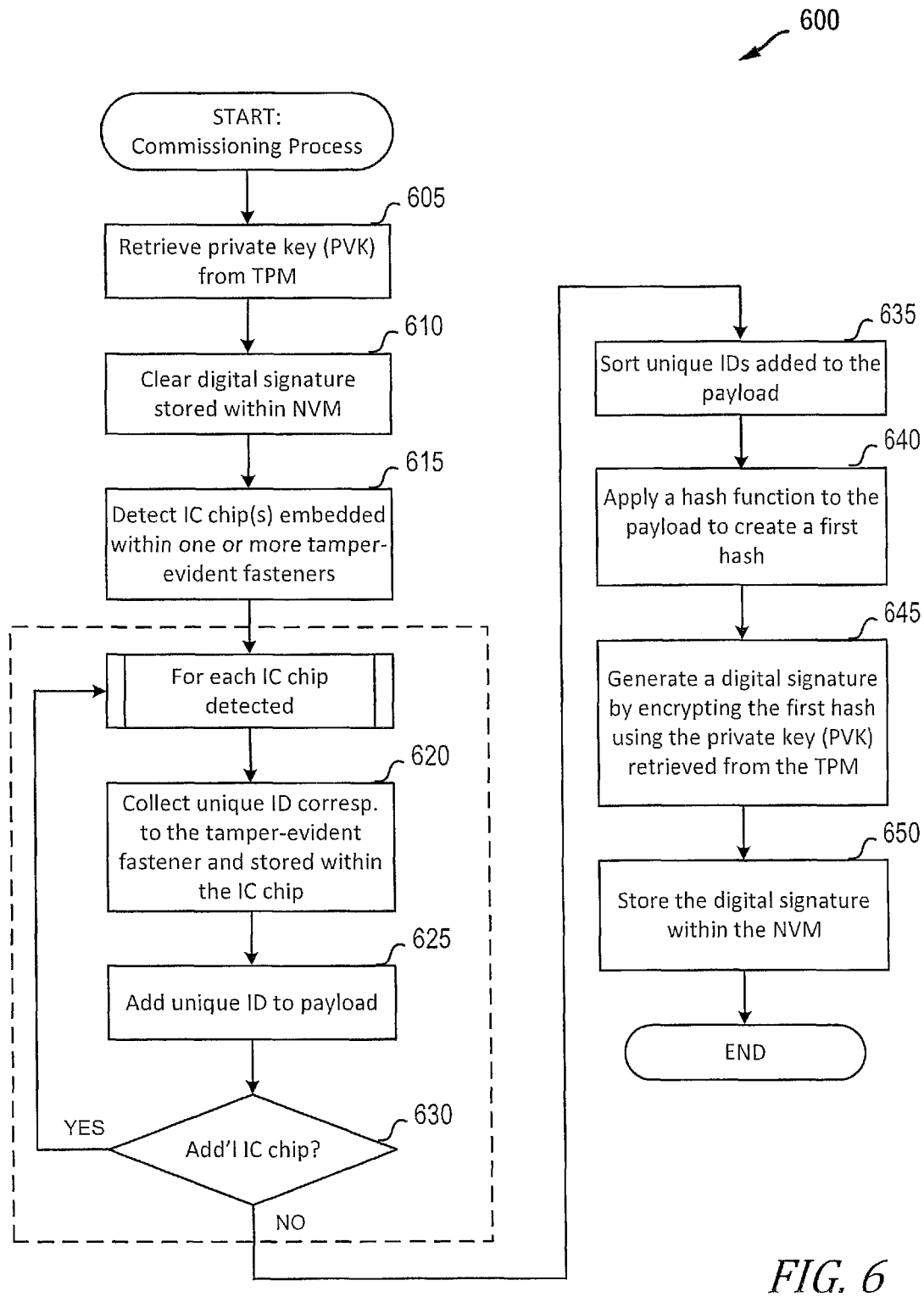
FIG. 6 is a flowchart diagram illustrating one embodiment of a method, which may be performed before a host device is in use, to cryptographically secure one or more tamper-evident assemblies to a processing device and trusted platform module included within the host device.
Figure 7:
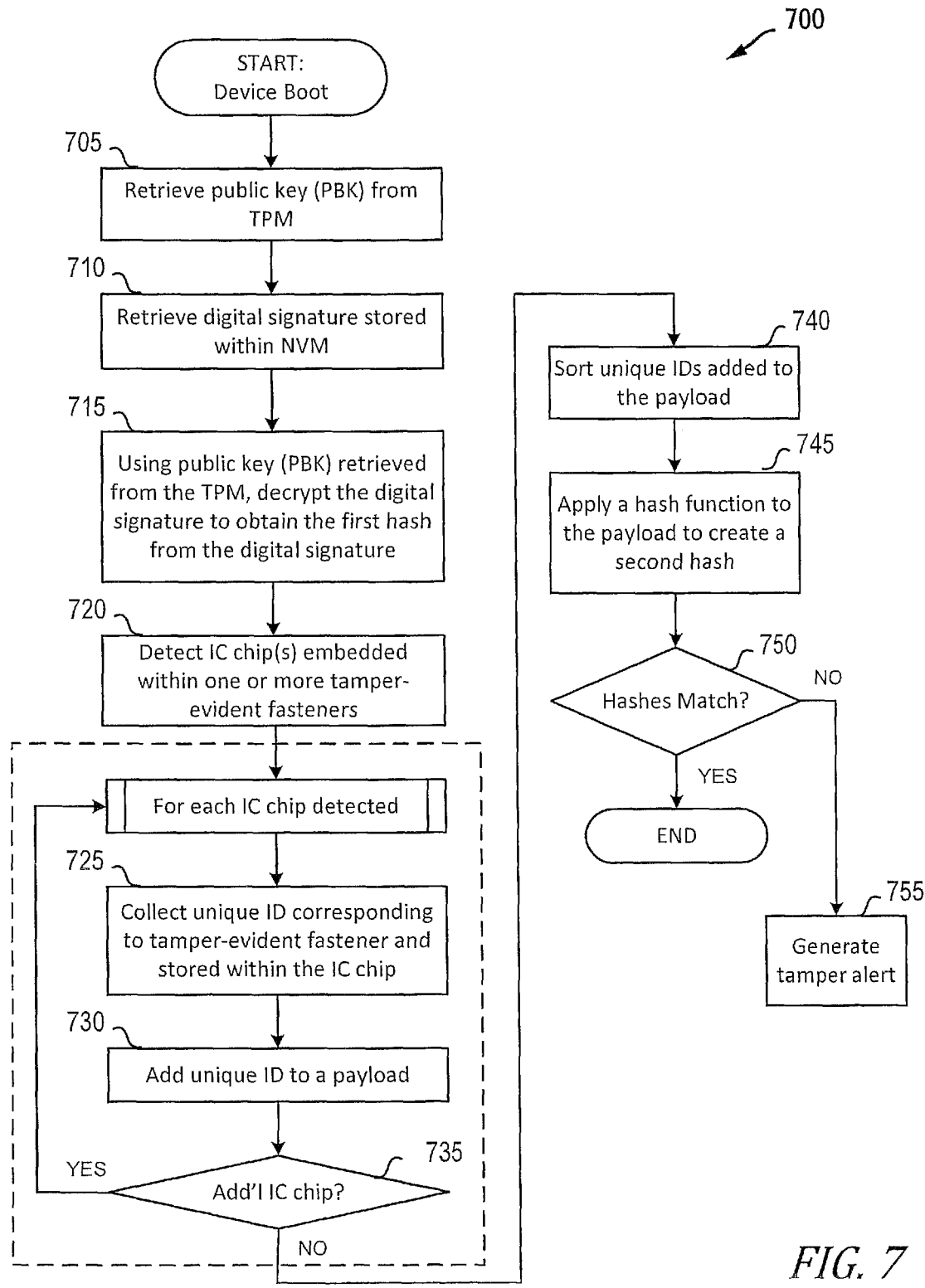
FIG. 7 is a flowchart diagram illustrating one embodiment of a method, which may be performed when the host device is booted, to detect tampering and/or provide cryptographic evidence of tampering.
Figure 8:
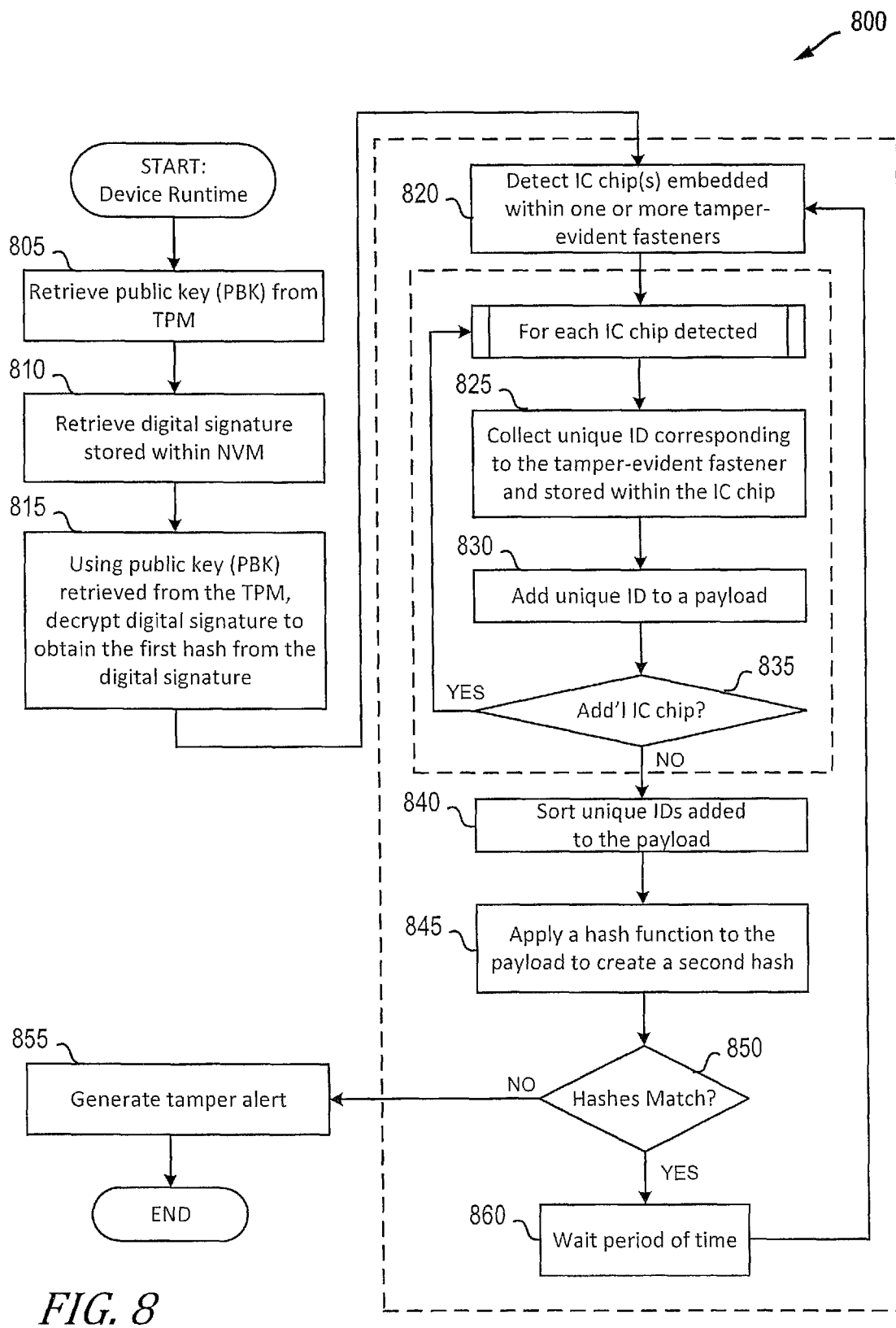
FIG. 8 is a flowchart diagram illustrating one embodiment of a method, which may be performed when the host device is in use, to detect tampering and/or provide cryptographic evidence of tampering.

FIGS. 6-8 illustrate various embodiments of methods that may be used by the system 500 embodiments shown in FIGS. 5B and 5C to detect tampering and/or provide cryptographic evidence of tampering. For example, FIG. 6 illustrates one embodiment of a method 600 that may be performed during a commissioning process, before the host device 505 is in use, to cryptographically secure one or more tamper-evident assemblies (e.g., one or more smart screw assemblies 100) to a processing device (530) and trusted platform module (535) included, for example, on a host PCB 510 of the host device 505. FIG. 7 illustrates one embodiment of a method 700 that may be performed when the host device 505 is booted to detect tampering and/or provide cryptographic evidence of tampering. FIG. 8 illustrates one embodiment of a method 800 that may be performed when the host device 505 is operational (e.g., during device runtime) to detect tampering and/or provide cryptographic evidence of tampering.

The methods shown in FIGS. 6-8 may be performed by at least one processing device, such as the processing device 530 shown in FIGS. 5B and 5C, executing program instructions that may be stored, for example, within a computer readable memory or computer readable storage device. As such, the methods shown in FIGS. 6-8 are computer-implemented methods that are performed by hardware and software components of the host device 505.

It will be recognized that the embodiments shown in FIGS. 6-8 are exemplary and additional methods may utilize the techniques described herein. Further, additional steps may be added to the methods shown in the FIGS. 6-8 as the steps described are not intended to be exclusive. Moreover, the order of the steps is not limited to the order shown in FIGS. 6-8 as different orders may occur and/or various steps may be performed in combination or at the same time.

The method 600 shown in FIG. 6 may be performed during the commissioning process before the host device 505 is booted or operated in the field. In some embodiments, the processing device 530 on the host PCB 510 may begin the method 600 by retrieving the private key (PVK) 540 from the TPM 535 (in step 605) and clearing any digital signatures, which may have been previously stored within NVM 550 (in step 610). Next, the processing device 530 may attempt to detect the IC chips (or identification chips) embedded within one or more tamper evident fasteners (e.g., one or more smart screws 200), which are securely coupled to a surface 405 of the enclosure 400 housing the host device 505 (in step 615). As noted above, the processing device 530 may detect an IC chip, or more specifically, a data signal or unique identifier transmitted from the IC chip, only when a tamper-evident fastener is securely coupled to the surface 405 of the enclosure 400.

For each IC chip detected in step 615, the processing device 530 collects the unique identifier ("unique ID") corresponding to the tamper evident fastener (in step 620) and adds the unique identifier to a payload (in step 625). In step 630, the processing device 530 determines if there were additional IC chips detected in step 615. If so (YES branch of step 630), method steps 620 and 625 are repeated for each IC detected in step 615.

Once the unique identifiers corresponding to all IC chips are collected and added to the payload, the processing device 530 may sort the unique identifiers added to the payload (in step 635) and apply a hash function to the payload to create a first hash (in step 640). Next, the processing device 530 may generate a digital signature by encrypting the first hash using the private key (PVK) 540 retrieved from the TPM 535 (in step 645) and store the digital signature within NVM 550 (in step 650). Once the digital signature is stored (in step 650), the method 600 may end.

The method 700 shown in FIG. 7 may generally begin when the host device 505 is booted. When the host device 505 is booted, the processing device 530 retrieves the public key (PBK) 545 from the TPM 535 (in step 705) and retrieves the digital signature previously stored within the TPM 535 during the commissioning process (in step 710). Using the public key (PBK) 545 retrieved from the TPM 535 (in step 705), the processing device 530 decrypts the digital signature to obtain the first hash from the digital signature (in step 715).

Next, the processing device 530 may attempt to detect the IC chips (or identification chips) embedded within one or more tamper evident fasteners (e.g., one or more smart screws 200), which are securely coupled to a surface 405 of the enclosure 400 housing the host device 505 (in step 720). As noted above, the processing device 530 may detect an IC chip, or more specifically, a data signal or unique identifier transmitted from the IC chip, only when a tamper-evident fastener is securely coupled to the surface 405 of the enclosure 400. If a tamper-evident fastener is removed from the surface 405 of the enclosure 400 or damaged, the IC chip embedded within that tamper-evident fastener will not be detected in step 720.

For each IC chip detected in step 720, the processing device 530 collects the unique identifier ("unique ID") corresponding to the tamper evident fastener (in step 725) and adds the unique identifier to a payload (in step 730). In step 735, the processing device 530 determines if there were additional IC chips detected in step 720. If so (YES branch of step 735), method steps 725 and 730 are repeated for each IC detected in step 720.

Once the unique identifiers corresponding to all IC chips are collected and added to the payload, the processing device 530 may sort the unique identifiers added to the payload (in step 740) and apply a hash function to the payload to create a second hash (in step 745). Next, the processing device 530 may compare the second hash to the first hash (in step 750). If the second hash does not match the first hash (NO branch of step 750), the processing device 530 may detect tampering and/or provide cryptographic evidence of tampering, for example, by generating a tamper alert (in step 755). Otherwise, the method 700 may end.

The method 800 shown in FIG. 8 may generally begin when the host device 505 is operational (e.g., during device runtime). The method steps 805-855 shown in FIG. 8 are identical to the method steps 705-755 shown in FIG. 7 and described above. The method 800 shown in FIG. 8 differs from the method 700 shown in FIG. 7 by periodically repeating method steps 820-850, when the host device 505 is operational, to monitor for tampering attempts during device runtime. If the second hash matches the first hash (YES branch of step 850), the processing device 530 may wait a period of time (in step 860) before repeating steps 820-850 until: (a) tampering is detected and a tamper alert is generated (in step 855), or (b) the host device 505 is no longer in use.

The methods 700 and 800 shown in FIGS. 7 and 8 detect tampering when attempts are made to remove at least one tamper-evident fastener from the surface 405 of the enclosure 400 when the host device 505 is in use. In some embodiments, tampering events may be detected when the host device 505 is not in use. In some embodiments, the methods 700 and 800 shown in FIGS. 7 and 8 may generate a tamper alert when tampering is detected. A wide variety of tamper alerts may be in generated in step 755 of FIG. 7 and step 855 of FIG. 8. Examples of tamper alerts include, but are not limited to, audible alerts (e.g., alarms and other sounds), visual alerts (e.g., lights, messages displayed on screens, etc.), transmitted alerts (e.g., an alert transmitted wirelessly to another system or device), etc. In some embodiments, the processing device 525/530 may block further execution until the tamper alert generated in steps 755/855 is processed and/or acknowledged, or may even halt (or "panic") the system. In some embodiments, the tamper alert generated in steps 755/855 may be logged for recorded time keeping of the tamper event.

The tamper-evident assembly shown in FIGS. 1-4, the system 500 shown in FIGS. 5A-5C and the computer-implemented methods 600/700/800 shown in FIGS. 6-8 improve tamper resistance and/or provide strong tamper evidence in a variety of different ways. For example, the tamper-evident assembly, the system 500 and the methods 600/700/800 may be used to detect tampering and/or provide evidence of tampering without human interaction or oversight. In some embodiments, the tamper-evident assembly, the system 500 and the methods 600/700/800 may use various cryptographic techniques to further deter tampering and/or provide even stronger evidence of tampering. By improving tamper resistance and tamper evidence, the embodiments described herein may be used to improve confidentiality, security or chain of custody for a host device.

Other advantages pertaining to tamper evidence may be apparent to those skilled in the art in view of this description. For example, a tamper-evident assembly having one or more tamper-evident fasteners with embedded IC chip (or identification chip) can be used to provide tamper evidence with absolute traceability. The tamper-evident assembly is designed to secure a point of entry on an enclosure and embed directly into a PCB subassembly incorporated within the enclosure. The IC chip embedded within the tamper-evident fastener is configured to transmit data and ground signals through the tamper-evident fastener when the tamper-evident fastener is coupled to the surface of the enclosure to secure the point of entry on the enclosure. The data and ground signals are electrically isolated within the body of the tamper-evident fastener and make independent connections into the PCB subassembly. When the tamper-evident fastener is coupled securely to the surface of the enclosure, the data signal is supplied to at least one processing device (e.g., an MCU, CPU, etc.), which can be mounted on the PCB sub-assembly and/or mounted on a host PCB within a host device. In some embodiments, the at least one processing device may detect tampering when the data signal is not received.

Unlike conventional tamper-evident fasteners, the tamper-evident fastener described herein is truly designed for one-way entry. Once secured into the PCB subassembly, the tamper-evident fastener described herein cannot be removed without damage. If an attempt is made to remove the tamper-evident fastener from the surface of the enclosure, the IC chip is destroyed in the process, resulting in a failed electrical connection (i.e., the data signal is not received). If the tamper-evident fastener is "drilled" to remove it, that too results in the failure of the IC chip and failed electrical connection, resulting in a true one-time use assembly on insert. Any attempt to remove the tamper-evident fastener will result in its failure and detection of tampering.

In some embodiments, the IC chip may be omitted and replaced with a resistor, fuse, filament or other electronics. If an attempt is made to remove the tamper-evident fastener from the surface of the enclosure, the resistor, fuse, filament or other electronics may be destroyed, resulting in a failed electrical connection (i.e., the data signal is not received). Thus, though described herein in some embodiments with regard to the use of an integrated circuit, it will be recognized that the concepts are not limited to such use.

In some embodiments, the IC chip embedded within each tamper-evident fastener may store a unique identifier correspond to that tamper-evident fastener. The unique identifier prevents the tamper-evident fastener from being removed and replaced with a new fastener, and enables cryptographic techniques to be utilized in the tamper detection. For example, one or more tamper-evident fasteners, each having their own unique identifier, may be cryptographically secured before the host device is in use to a processing device and TPM (or other cryptographic hardware). The processing device and TPM may apply hash algorithms to the unique identifiers and use cryptographic keys to generate a cryptographic link between the tamper-evident assembly and the processing device. If at least one tamper-evident fastener is removed or damaged, the cryptographic link is destroyed and the processing device and associated software recognizes a cryptographic state change that enables the processing device to detect that the system was tampered with.

Further modifications and alternative embodiments of the inventions described herein will be apparent to those skilled in the art in view of this description. For example, although some of the embodiments disclosed herein may utilize a TPM to generate the cryptographic link, other forms of cryptographic hardware may also be used. For example, the TPM described herein could be replaced, for example, with a microcontroller having a hardware security module (HSM), FPGA-base solutions, etc. Other modifications and alternative embodiments may also be utilized without departing from the scope of the invention.

Accordingly, this description is to be construed as illustrative only and is for the purpose of teaching those skilled in the art the manner of carrying out the inventions described and claimed herein. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this disclosure.

What is claimed is:

1. A system configured to detect tampering and/or provide cryptographic evidence of tampering, the system comprising:
    an enclosure comprising a point of entry for accessing an interior of the enclosure;
    a tamper-evident fastener coupled to a surface of the enclosure to secure the point of entry on the enclosure, wherein the tamper-evident fastener comprises a screw having a screw head, a screw body and an identification chip, which is embedded within the screw and configured to: (a) store a unique identifier corresponding to the tamper-evident fastener, and (b) transmit the unique identifier via electrical conduction through the screw body when the tamper-evident fastener is coupled to the surface of the enclosure; and
    a processing device provided within the enclosure, wherein the processing device is electronically coupled to the screw to receive the unique identifier, which is transmitted from the identification chip and through the screw body when the tamper-evident fastener is coupled to the surface of the enclosure to secure the point of entry, and wherein the processing device and program instructions are configured to detect tampering in response to the unique identifier not being received by the processing device.

2. The system of claim 1, wherein the screw body comprises:
    a hollow outer body formed integrally with the screw head, the hollow outer body comprising an inner cavity extending from within the screw head to an opening formed within a distal end of the hollow outer body; and
    a solid inner body comprising an upper portion and a threaded middle portion arranged within the inner cavity of the hollow outer body, and a non-threaded lower portion extending out from the inner cavity;
    wherein the identification chip is arranged within the inner cavity of the hollow outer body above the upper portion of the solid inner body, and wherein the identification chip is configured to transmit the unique identifier through the solid inner body or the hollow outer body when the screw is coupled to the surface of the enclosure to secure the point of entry.

3. The system of claim 1, wherein the screw further comprises a sharp tip arranged near a surface of the identification chip, and wherein when the screw is unscrewed from the surface of the enclosure, the sharp tip moves up towards the surface of the identification chip, which causes the sharp tip to damage the identification chip and prevent the identification chip from transmitting the unique identifier to the processing device.

4. The system of claim 1, the screw further comprising a mechanical weak point, wherein when the screw is unscrewed from the surface of the enclosure, the mechanical weak point breaks to prevent the identification chip from transmitting the unique identifier to the processing device and enable the screw to be removed from the surface of the enclosure.

5. The system of claim 1, wherein drilling into the screw head damages the identification chip and prevents the identification chip from transmitting the unique identifier to the processing device.

6. The system of claim 1, wherein the unique identifier is a serial number, an alphanumeric string or other data that uniquely identifies the tamper-evident fastener.

7. The system of claim 1, further comprising a host device housed within the enclosure.

8. The system of claim 7, wherein the host device comprises a voting system or voting equipment.

9. The system of claim 7, wherein the processing device is configured to detect unique identifiers received from the tamper-evident fastener before and after the host device is in use, and compare hashes of the unique identifiers detected before and after use to detect tampering and/or provide cryptographic evidence of tampering.

10. The system of claim 7, further comprising a plurality of tamper-evident fasteners, each comprising a screw having an identification chip embedded therein and configured to: (a) store a unique identifier corresponding to the tamper-evident fastener, and (b) transmit the unique identifier through the screw when the tamper-evident fastener is coupled to the surface of the enclosure to secure the point of entry, wherein the processing device is coupled to receive the unique identifier from each tamper-evident fastener that is coupled securely to the surface.

11. The system of claim 10, further comprising a printed circuit board (PCB) arranged within the enclosure and coupled to receive the plurality of tamper-evident fasteners when the plurality of tamper-evident fasteners are coupled to the surface of the enclosure to secure the point of entry.

12. The system of claim 11, wherein during a commissioning phase before the host device is in use, the processing device is configured to receive location metadata, which specifies a location of each of the tamper-evident fasteners on the PCB.

13. The system of claim 12, wherein when the host device is in use, the processing device is configured to utilize the location metadata, along with the unique identifiers received by the processing device, to detect tampering and identify a location of the tampering on the enclosure.

14. The system of claim 10, wherein during a commissioning phase before the host device is in use, the processing device is configured to execute a first set of program instructions to:
detect the unique identifiers transmitted from the identification chips of the plurality of tamper-evident fasteners;
collect the detected unique identifiers within a payload;
apply a hash function to the payload to create a first hash;
generate a digital signature by encrypting the first hash with a private key; and
store the digital signature within a non-volatile memory included within the system.

15. The system of claim 14, wherein when the host device is booted, the processing device is configured to execute a second set of program instructions to:
retrieve the digital signature stored within the non-volatile memory;
decrypt the digital signature using a public key to obtain the first hash from the digital signature;
detect the unique identifiers transmitted from the identification chips of each tamper-evident fastener that is coupled securely to the surface, wherein if a tamper-evident fastener is removed or damaged, the unique identifier corresponding to that tamper-evident fastener is not detected;
collect the detected unique identifiers within a payload;
apply a hash function to the payload to create a second hash;
compare the second hash to the first hash; and
detect tampering upon the second hash does not match the first hash or provide cryptographic evidence of tampering upon the second hash does not match the first hash.

16. The system of claim 15, wherein while the host device is in use, the processing device is configured to execute a third set of program instructions to:
detect the unique identifiers transmitted from the identification chips of each tamper-evident fastener that is coupled securely to the surface, wherein upon a tamper-evident fastener is removed or damaged, the unique identifier corresponding to that tamper-evident fastener is not detected;
collect the detected unique identifiers within a payload;
apply a hash function to the payload to create an additional hash;
compare the additional hash to the first hash; and
detect tampering upon the additional hash does not match the first hash or provide cryptographic evidence of tampering upon the additional hash does not match the first hash.

17. The system of claim 16, wherein if the additional hash matches the first hash, the processing device is configured to wait a period of time before re-executing the third set of program instructions.

18. The system of claim 1, wherein the processing device and program instructions are further configured to provide evidence of tampering in response to the unique identifier not being received by the processing device.

19. A system configured to detect tampering and/or provide evidence of tampering, the system comprising:
a smart screw, comprising:
an screw head;
a screw body; and
an identification chip arranged within the smart screw, wherein the identification chip is configured to: (a) store a unique identifier corresponding to the smart screw, and (b) transmit the unique identifier through the screw body when the smart screw is coupled to a surface of an enclosure to secure a point of entry into the enclosure; and
a processing device provided within the enclosure, the processing device electronically coupled to the smart screw to receive the unique identifier, which is transmitted from the identification chip and through the screw body when the smart screw is coupled to the surface of the enclosure to secure the point of entry, wherein the processing device and program instructions are configured to detect tampering in response to the unique identifier not being received by the processing device.

20. The system of claim 19, wherein the screw body comprises:
a hollow outer body formed integrally with the screw head, the hollow outer body comprising an inner cavity extending from within the screw head to an opening formed within a distal end of the hollow outer body; and
a solid inner body comprising an upper portion and a threaded middle portion arranged within the inner cavity of the hollow outer body, and a non-threaded lower portion extending out from the inner cavity; and wherein the identification chip is arranged within the inner cavity of the hollow outer body above the upper portion of the solid inner body.

21. The system of claim 19, wherein the screw body comprises a sharp tip arranged near a lower surface of the identification chip, and wherein when the smart screw is unscrewed from the surface of the enclosure, the sharp tip damages the identification chip and prevents the identification chip from transmitting the unique identifier to the processing device.

22. The system of claim 19, wherein the screw body comprises a mechanical weak point, and wherein when the smart screw is unscrewed from the surface of the enclosure, the mechanical weak point breaks to prevent the identification chip from transmitting the unique identifier to the processing device and enable the smart screw to be removed from the surface of the enclosure.

23. The system of claim 19, wherein drilling into the screw head damages the identification chip and prevents the identification chip from transmitting the unique identifier to the processing device.

24. The system of claim 19, wherein the unique identifier is a serial number, an alphanumeric string or other data that uniquely identifies the smart screw.

25. The system of claim 19, further comprising a host device housed within the enclosure, and wherein the processing device is configured to detect unique identifiers received from the identification chip before and after the host device is in use, and compare hashes of the unique identifiers detected before and after use to detect tampering and/or provide cryptographic evidence of tampering.

26. The system of claim 19, wherein the processing device and program instructions are further configured to provide evidence of tampering in response to the unique identifier not being received by the processing device.

27. A method to detect tampering and/or provide cryptographic evidence of tampering of an enclosure, wherein the enclosure comprises a point of entry for accessing an interior of the enclosure, the method comprising:
coupling one or more tamper-evident fasteners to a surface of the enclosure to secure the point of entry on the enclosure, wherein each tamper-evident fastener comprises a screw having a screw head, a screw body and an identification chip, which is embedded within the screw and configured to: (a) store a unique identifier corresponding to the tamper-evident fastener, and (b) transmit the unique identifier through the screw body when the tamper-evident fastener is coupled to the surface of the enclosure;
receiving the unique identifiers, which are transmitted from the identification chip and through the screw body of each tamper-evident fastener that is coupled securely to the surface of the enclosure, wherein upon a tamper-evident fastener is removed from the surface of the enclosure or damaged, the unique identifier corresponding to that tamper-evident fastener is not received, the unique identifiers received by a processing device provided within the enclosure;
collecting the received unique identifiers within a payload;
applying a hash function to the payload to create a second hash;
comparing the second hash to a first hash previously created during a commissioning phase; and
detecting tampering upon the second hash does not match the first hash or providing cryptographic evidence of tampering upon the second hash does not match the first hash.

28. The method of claim 27, wherein during the commissioning phase, the method further comprises:
receiving the unique identifiers transmitted from the identification chips of the one or more tamper-evident fasteners;
collecting the received unique identifiers within a payload;
apply a hash function to the payload to create the first hash;
generating a digital signature by encrypting the first hash with a private key; and
storing the digital signature within a non-volatile memory.

29. The method of claim 28, further comprising:
retrieving the digital signature stored within the non-volatile memory; and
decrypting the digital signature using a public key to obtain the first hash from the digital signature.

30. The method of claim 27, wherein if the second hash matches the first hash, the method further comprises:
waiting a period of time; and
repeating said receiving, said collecting, said applying, said comparing and said detecting.

31. The method of claim 27, wherein if the second hash does not match the first hash, the method further comprises generating a tamper alert.

32. The method of claim 31, wherein said generating a tamper alert comprises generating an audible alert or a visual alert.

33. The method of claim 31, further comprising transmitting the tamper alert to a system or device.

34. The method of claim 31, wherein in response to said generating a tamper alert comprises, the method further comprises one or more of the following:
logging the tamper alert to record a tamper event; and
blocking execution of a processing device included within the enclosure until the tamper alert is processed.

* * * * *